US011049476B2

(12) United States Patent
Fuchs et al.

(10) Patent No.: US 11,049,476 B2
(45) Date of Patent: Jun. 29, 2021

(54) MINIMAL-LATENCY TRACKING AND DISPLAY FOR MATCHING REAL AND VIRTUAL WORLDS IN HEAD-WORN DISPLAYS

(71) Applicant: The University of North Carolina at Chapel Hill, Chapel Hill, NC (US)

(72) Inventors: Henry Fuchs, Chapel Hill, NC (US); Anselmo A. Lastra, Chapel Hill, NC (US); John Turner Whitted, Pittsboro, NC (US); Feng Zheng, Chapel Hill, NC (US); Andrei State, Chapel Hill, NC (US); Gregory Welch, Longwood, FL (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 15/522,765

(22) PCT Filed: Nov. 4, 2015

(86) PCT No.: PCT/US2015/058959
§ 371 (c)(1),
(2) Date: Apr. 27, 2017

(87) PCT Pub. No.: WO2016/073557
PCT Pub. Date: May 12, 2016

(65) Prior Publication Data
US 2017/0345398 A1 Nov. 30, 2017

Related U.S. Application Data

(60) Provisional application No. 62/075,221, filed on Nov. 4, 2014.

(51) Int. Cl.
*G09G 5/377* (2006.01)
*G06F 3/147* (2006.01)
*G02B 27/01* (2006.01)

(52) U.S. Cl.
CPC ......... *G09G 5/377* (2013.01); *G02B 27/0101* (2013.01); *G02B 27/017* (2013.01);
(Continued)

(58) Field of Classification Search
CPC ............... G09G 5/377; G02B 27/0176; G02B 27/0101; G02B 27/017; G02B 2027/014; G02B 2027/0178; G06F 3/147
See application file for complete search history.

(56) References Cited

U.S. PATENT DOCUMENTS 6,503,195 B1 1/2003 Keller et al.
7,453,514 B2 11/2008 Furlan et al.
(Continued)

FOREIGN PATENT DOCUMENTS

KR 10-2005-0082348 8/2005
KR 10-2009-0047889 5/2009
(Continued)

OTHER PUBLICATIONS

Examiner-Initiated Interview Summary for U.S. Appl. No. 14/401,833 (dated Mar. 9, 2018).
(Continued)

*Primary Examiner* — Mark W Regn
(74) *Attorney, Agent, or Firm* — Jenkins, Wilson, Taylor & Hunt, P.A.

(57) ABSTRACT

Methods, systems, and computer readable media for minimal-latency tracking and display for matching real and virtual worlds in head-worn displays are disclosed. According to one aspect, a method for minimal-latency tracking and display for matching real and virtual worlds in head-worn
(Continued)

displays includes calculating a desired image, calculating an error image as the difference between the desired image and an image currently being perceived by a user, identifying as an error portion a portion of the error image having the largest error, updating a portion of a projected image that corresponds to the error portion, and recalculating the image currently being perceived by a user based on the updated projected image.

20 Claims, 22 Drawing Sheets

(52) U.S. Cl.
CPC ......... *G02B 27/0176* (2013.01); *G06F 3/147* (2013.01); *G02B 2027/014* (2013.01); *G02B 2027/0178* (2013.01)

(56) References Cited

U.S. PATENT DOCUMENTS

| | | | |
|---|---|---|---|
| 8,617,058 | B2 | 12/2013 | Arneson |
| 9,898,866 | B2 | 2/2018 | Fuchs et al. |
| 10,074,031 | B2 | 9/2018 | Krenzer et al. |
| 10,365,711 | B2 | 7/2019 | Fuchs et al. |
| 10,410,372 | B1 | 9/2019 | Bapat et al. |
| 2002/0018058 | A1* | 2/2002 | Tamura ............ G06F 3/147 345/204 |
| 2002/0118861 | A1 | 8/2002 | Jouppi et al. |
| 2005/0083248 | A1 | 4/2005 | Biocca et al. |
| 2005/0168403 | A1 | 8/2005 | Ebersole, Jr. et al. |
| 2006/0161572 | A1 | 7/2006 | Vogt et al. |
| 2009/0185715 | A1 | 7/2009 | Hofhauser et al. |
| 2009/0213037 | A1 | 8/2009 | Schon |
| 2010/0053325 | A1 | 3/2010 | Inagaki |
| 2010/0253859 | A1* | 10/2010 | Hall, Jr. ............ G03B 27/50 348/739 |
| 2011/0018903 | A1 | 1/2011 | Lapstun et al. |
| 2011/0211082 | A1 | 9/2011 | Forssén et al. |
| 2012/0062702 | A1 | 3/2012 | Jiang et al. |
| 2012/0093365 | A1 | 4/2012 | Aragane et al. |
| 2012/0098926 | A1 | 4/2012 | Kweon |
| 2012/0105473 | A1* | 5/2012 | Bar-Zeev ............ G02B 27/017 345/633 |
| 2012/0113092 | A1 | 5/2012 | Bar-Zeev et al. |
| 2012/0119978 | A1 | 5/2012 | Border et al. |
| 2012/0192088 | A1 | 7/2012 | Sauriol et al. |
| 2012/0236184 | A1* | 9/2012 | Jia ............ G06T 5/005 348/241 |
| 2012/0307075 | A1 | 12/2012 | Margalit |
| 2012/0320224 | A1 | 12/2012 | Miyoshi et al. |
| 2013/0128055 | A1* | 5/2013 | Vanderhoff .......... H04N 17/004 348/180 |
| 2013/0201291 | A1 | 8/2013 | Liu et al. |
| 2014/0118496 | A1 | 5/2014 | Calakli et al. |
| 2015/0138069 | A1 | 5/2015 | Fuchs et al. |
| 2015/0369609 | A1 | 12/2015 | Roumeliotis et al. |
| 2016/0035139 | A1 | 2/2016 | Fuchs et al. |
| 2017/0018086 | A1 | 1/2017 | Zhang |
| 2017/0026599 | A1 | 1/2017 | He et al. |
| 2017/0032214 | A1 | 2/2017 | Krenzer et al. |
| 2018/0053284 | A1 | 2/2018 | Rodriguez et al. |
| 2018/0054575 | A1 | 2/2018 | Pawlowicz et al. |
| 2018/0068462 | A1 | 3/2018 | Wakai et al. |
| 2018/0157946 | A1 | 6/2018 | Landry et al. |
| 2018/0173963 | A1 | 6/2018 | Taylor |
| 2019/0096043 | A1 | 3/2019 | Ma et al. |

FOREIGN PATENT DOCUMENTS

| | | |
|---|---|---|
| WO | WO 2004/012141 A1 | 2/2004 |
| WO | WO 2013/173728 A1 | 11/2013 |
| WO | WO 2014/160342 A1 | 10/2014 |

OTHER PUBLICATIONS

Bapat et al., "Rolling Shutter and Radial Distortion are Features for High Frame Rate Multi-Camera Tracking," Department of Computer Science, The University of North Carolina at Chapel Hill, pp. 1-10 (publication date unknown).

Geyer et al., "Geometric Models of Rolling-Shutter Cameras," EECS Department, University of California, Berkeley, pp. 1-8 (publication date unknown).

Final Office Action for U.S. Appl. No. 14/401,833 (dated Jun. 27, 2018).

Kim et al., "Rrd-Slam: Radial-Distorted Rolling-Shutter Direct Slam," Robotics and Automation (ICRA), pp. 5148-5154 (2017).

Albl et al., "Degeneracies in Rolling Shutter SFM," European Conference on Computer Vision, pp. 36-51 (2016).

Bapat et al., "Towards Kilo-Hertz 6-DOF Visual Tracking Using an Egocentric Cluster of Rolling Shutter Cameras," IEEE Transactions on Visualization and Computer Graphics, Vol. 22, No. 11, pp. 2358-2367 (2016).

Dai et al., "Rolling Shutter Camera Relative Pose: Generalized Epipolar Geometry," The IEEE Conference on Computer Vision and Pattern Recognition (CVPR), pp. 1-11 (2016).

Kim et al., "Direct Semi-Dense Slam for Rolling Shutter Cameras," School of Computer Science, University of Adelaide, Australia, pp. 1-8 (2016).

Lincoln et al., "From Motion to Photons in 80 Microseconds: Toward Minimal Latency for Virtual and Augmented Reality," IEEE Transactions on Visualization and Computer Graphics, vol. 22, No. 4, pp. 1367-1376 (2016).

Rengarajan et al., "From Bows to Arrows: Rolling Shutter Rectification of Urban Scenes," Proceedings of the IEEE Conference on Computer Vision and Pattern Recognition, pp. 2773-2781 (2016).

Saurer et al., "Sparse to Dense 3d Reconstruction from Rolling Shutter Images," IEEE Computer Vision and Pattern Recognition, pp. 1-9 (2016).

Albl et al., "R6p-Rolling Shutter Absolute Camera Pose," Proceedings of the IEEE Conference on Computer Vision and Pattern Recognition, pp. 2292-2300 (2015).

Kerl et al., "Dense Continuous-Time Tracking and Mapping with Rolling Shutter RGB-D Cameras," Proceedings of the IEEE International Conference on Computer Vision, pp. 2264-2272 (2015).

Patron-Perez et al., "A Spline-Based Trajectory Representation for Sensor Fusion and Rolling Shutter Cameras," International Journal of Computer Vision, vol. 113, No. 3, pp. 208-219 (2015).

Saurer et al., "A Minimal Solution to the Rolling Shutter Pose Estmation Problem," Intelligent Robots and System (IROS), pp. 1328-1334 (2015).

Engel et al., "LSD-SLAM, General Notes on Good Results," https://github.com/tum-vision/lsd_slam#316-general-notes-for-good-results, pp. 1-7 (2014).

Engel et al., "LSD SLAM: Large-Scale Direct Monocular Slam," European Conference on Computer Vision, Springer, pp. 834-849 (2014).

LaValle et al., "Head Tracking for the Oculus Rift," Robotics and Automation (ICRA), pp. 187-194 (2014).

Zheng et al., Minimizing Latency for Augmented Reality Displays: Frames Considered Harmful, International Symposium on Mixed and Augmented Reality (ISMAR), pp. 195-200 (2014).

Oth et al., "Rolling Shutter Camera Calibration," Proceedings of the IEEE Conference on Computer Vision and Pattern Recognition, pp. 1350-1367 (2013).

Saurer et al., "Rolling Shutter Stereo," Proceedings of the IEEE Intl. Conference on Computer Vision, pp. 465-472 (2013).

Dou et al., "Exploring High-Level Plane Primitives for Indoor 3d Reconstruction with a Hand-Held RGB-D Camera," Asian Conference on Computer Vision, Springer, pp. 94-108 (2012).

Grundmann et al., "Effective Calibration Free Rolling Shutter Removal," http://www.cc.gatech.edu/cpl/projects/rollingshutter, pp. 1-8 (2012).

Handa et al., "Real-Time Camera Tracking: When is High Frame-Rate Best?" European Conference on Computer Vision, Spring, pp. 222-235 (2012).

(56) References Cited

OTHER PUBLICATIONS

Hedborg et al., "Rolling Shutter Bundle Adjustment," Computer Vision and Pattern Recognition (CVPR), pp. 1434-1441 (2012).
Magerand et al., "Global Optimization of Object Pose and Motion from a Single Rolling Shutter Image with Automatic 2d-3d Matching," European Conference on Computer Vision, Springer, pp. 456-469 (2012).
Liu et al., "Subspace Video Stabilization," ACM Transactions on Graphics (TOG), vol. 30, No. 1, pp. 1-4 (2011).
Forssen et al., "Rectifying Rolling Shutter Video from Hand-Held Devices," Computer Vision and Pattern Recognition (CVPR), pp. 507-514 (2010).
Gelper et al., "Robust Forecasting with Exponential and Holt-Winters Smoothing," Journal of Forecasting, vol. 29, No. 3, pp. 1-22 (2010).
Bradley et al., "Synchronization and Rolling Shutter Compensation for Consumer Video Camera Arrays," Computer Vision and Pattern Recognition Workshops, 2009. CVPR Workshops 2009. IEEE Computer Society Conference, pp. 1-8 (2009).
Ait-Adler et al., "Kinematics from Lines in a Single Rolling Shutter Image," Computer Vision and Pattern Recognition, 2007, pp. 1-6 (2007).
Ait-Aider et al., "Exploiting Rolling Shutter Distortions for Simultaneous Object Pose and Velocity Computation Using a Single View," Computer Vision Systems, 2006 ICVS'06, pp. 1-7 (2006).
Sanchez-Vives et al., "From Presence Toward Consciousness," 8th Annual Conference for the Scientific Study of Consciousness, pp. 1-34 (2004).
Zhang, "A Flexible New Technique for Camera Calibration," IEEE Transactions on Pattern Analysis and Machine Intelligence, vol. 22, No. 11, pp. 1330-1334 (2000).
Welch et al., "The Hiball Tracker: High-Performance Wide-Area Tracking for Virtual and Augmented Environments," Proceedings of the ACM Symposium on Virtual Reality Software and Technology, pp. 1-11 (1999).
Tsai et al., "A New Technique for Fully Autonomous and Efficient 3d Robotics Hand/Eye Calibration," IEEE Transactions on Robotics and Automation, vol. 5, No. 3, pp. 345-358 (1989).
Brown, "Decentering Distortion of Lenses," Photometric Engineering, vol. 32, No. 3, pp. 444-462 (1966).
Notice of Allowance and Fee(s) Due and Examiner-Initiated Interview Summary for U.S. Appl. No. 14/776,244 (dated Oct. 3, 2017).
Non-Final Office Action for U.S. Appl. No. 14/776,244 (dated May 18, 2017).
Final Office Action for U.S. Appl. No. 14/401,833 (dated May 12, 2017).
"HCC: CGV: Small: Just-in-Time Tracking and Display for Matching Real and Virtual Worlds in Head-Worn Displays," pp. 1-19 (Publication Date Unknown).
Adelstein et al., "Head tracking latency in virtual environments: psychophysics and a model," Proceedings of the Human Factors and Ergonomics Society Annual Meeting, vol. 47, pp. 2083-2087, SAGE Publications, (2003).
Applicant Initiated Interview Summary for U.S. Appl. No. 14/401,833 dated Mar. 17, 2016.
Asteriadis et al., "Head pose estimation with one camera, in uncalibrated environments," Proceedings of the 2010 workshop on Eye gaze in intelligent human machine interaction, EGIHMI '10, pp. 55-62, New York, NY, USA (2010).
Baker et al., "Removing rolling shutter wobble," Computer Vision and Pattern Recognition (CVPR), 2010 IEEE Conference, pp. 2392-2399 (Jun. 2010).
Belhumeur et al., "What is the set of images of an object under all possible illumination conditions?," Int. J. Comput. Vision, vol. 28, No. 3, pp. 1-16 (Jul. 1998).
Bishop, "Self-Tracker: A Smart Optical Sensor on Silicon," Dissertation, http://www.cs.unc.edu/~gb/Pubs/SelfTracker.pdf, pp. 1-61 (1984).
Caudell et al., "Augmented reality: an application of heads-up display technology to manual manufacturing processes," Proceedings of the Twenty-Fifth Hawaii International Conference on System Sciences, vol. 2, pp. 659-669 (Jan. 1992).
Clipp et al., "Parallel, real-time visual slam," 2010 IEEE/RSJ International Conference on Intelligent Robots and Systems (IROS), pp. 3961-3968, IEEE (2010).
Comaniciu et al., "Mean shift: A robust approach toward feature space analysis," IEEE Trans. Pattern Anal. Mach. Intell., vol. 24, No. 5, pp. 603-619, (May 2002).
Coombe et al., "An incremental weighted least squares approach to surface lights fields," GRAPP International Conference on Computer Graphics Theory and Applications, pp. 84-91, (2006).
Coombe et al., "Online Construction of Surface Light Felds," EGSR, pp. 1-9 (2005).
Coombe et al., "Radiosity on graphics hardware," Proceedings of Graphics Interface, pp. 1-8 (2004).
Coombe, "Practical Surface Light Fields," Phd Dissertation, pp. 1-110 (2007).
Davison et al., "Monoslam: Real-time single camera slam," IEEE Transactions on Pattern Analysis and Machine Intelligence, vol. 29, No. 6, pp. 1052-1067 (2007).
Davison, "Real-time simultaneous localisation and mapping with a single camera," Proceedings of the Ninth IEEE International Conference on Computer Vision, pp. 1403-1410, IEEE, (2003).
Deering et al., "The triangle processor and normal vector shader: a VLSI system for high performance graphics," Proceedings of the 15th annual conference on Computer graphics and interactive techniques, SIGGRAPH '88, pp. 21-30, New York, NY, USA, ACM, (1988).
DLP Discovery 4100 Development Kit, http://www.ti.com/tool/dlpd4x00kit, pp. 1-4 (Jan. 2014).
Dou et al., "Scanning and Tracking Dynamic Objects with Commodity Depth Cameras," Mixed and Augmented Reality (ISMAR), IEEE International Symposium, pp. 1-8 (2013).
Elgammal, "Learning to track: Conceptual manifold map for closed-form tracking," Proceedings of the 2005 IEEE Computer Society Conference on Computer Vision and Pattern Recognition (CVPR'05), vol. 1, CVPR '05, pp. 724-730, Washington, DC, USA, IEEE Computer Society, (2005).
Ellis et al., "Three dimensional tracking in augmented environments: user performance trade-offs between system latency and update rate," Proceedings of the Human Factors and Ergonomics Society annual meeting, vol. 46, pp. 2149-2153, SAGE Publications, (2002).
Feiner et al., "A touring machine: Prototyping 3d mobile augmented reality systems for exploring the urban environment," Proceedings of the 1st IEEE International Symposium on Wearable Computers, ISWC '97, pp. 74-81, Washington, DC, USA, IEEE Computer Society, (1997).
Feiner et al., "Knowledge-based augmented reality," Commun. ACM, vol. 36, No. 7, pp. 53-62, (Jul. 1993).
Final Office Action for U.S. Appl. No. 14/401,833 (dated Jun. 10, 2016).
Fischler et al., "Random sample consensus: a paradigm for model fitting with applications to image analysis and automated cartography," Commun. ACM, vol. 24, No. 6, pp. 381-395, (Jun. 1981).
Forsse et al., "Rectifying rolling shutter video from hand-held devices," 2010 IEEE Conference on Computer Vision and Pattern Recognition (CVPR), pp. 507-514, (Jun. 2010).
Fossum, "Cmos image sensors: electronic camera on a chip," International Electron Devices Meeting, 1995, IEDM '95, pp. 17-25, (Dec. 1995).
Fuchs et al., "Augmented reality visualization for laparoscopic surgery," Proceedings of the First International Conference on Medical Image Computing and Computer-Assisted Intervention, Springer-Verlag, pp. 1-10 (1998).
Fuchs, "Augmenting Reality for Medicine, Training, Presence, and Telepresence," Proceedings IEEE International Symposium on Mixed and Augmented Reality (ISMAR 2010), 1 page (2010).
Gabbard et al., "User-centered design and evaluation of virtual environments," Computer Graphics and Applications, IEEE, vol. 19, No. 6, pp. 51-59, (1999).

(56) References Cited

OTHER PUBLICATIONS

Gu et al., "Coded Rolling Shutter Photography: Flexible Space-Time Sampling," Computational Photography (ICCP), 2010 IEEE International Conference, pp. 1-8 (Mar. 2010).
Hager et al., "Efficient region tracking with parametric models of geometry and illumination," IEEE Transactions on Pattern Analysis and Machine Intelligence, vol. 20, No. 10, pp. 1025-1039, (Oct. 1998).
Hanna, "Direct multi-resolution estimation of ego-motion and structure from motion," Proceedings of the IEEE Workshop on Visual Motion, pp. 156-162, (Oct. 1991).
Harris et al., "Physically-based visual simulation on graphics hardware," SIGGRAPH / Eurographics Workshop on Graphics Hardware, pp. 109-118, 160 (2002).
Harris et al., "Simulation of cloud dynamics on graphics hardware," Proceedings of Graphics Hardware, pp. 1-10 (2003).
Harris, "Real-Time Cloud Simulation and Rendering," PhD Dissertation (available as technical report #tr03-040), pp. 1-191 (2003).
Hedborg et al., "Structure and Motion Estimation from Rolling Shutter Video," IEEE International Conference on Computer Vision Workshops, pp. 17-23 (2011).
Heeger et al., "Subspace methods for recovering rigid motion i: Algorithm and implementation," International Journal of Computer Vision, vol. 7, pp. 95-117, (1992).
Hensley et al., "A fast, energy-efficient z-comparator," Proceedings of Graphics Hardware, pp. 41-44, 2005.
Hensley et al., "A scalable counterflow-pipelined asynchronous radix-4 booth multiplier," Proceedings of the 11th IEEE International Symposium on Computer Design, IEEE Computer Society, pp. 1-10 (2005).
Hensley et al., "An area- and energy-efficient asynchronous booth multiplier for mobile devices," Proc. Int. Conf. Computer Design (ICCD), pp. 1-8, (2004).
Hensley et al., "Fast summed-area table generation and its applications," Proceedings of Eurographics 2005 and Computer Graphics Forum, vol. 24, No. 3, pp. 1-9 (2005).
Hensley et al., "Increasing Rendering Performance of Graphics Hardware," PhD dissertation, pp. 1-109 (2007).
Horn et al., "Interactive k-d tree GPU raytracing," Proceedings of the 2007 symposium on Interactive 3D graphics and games, I3D '07, pp. 167-174, New York, NY, USA, ACM, pp. 1-8 (2007).
Jacobs et al., "Managing latency in complex augmented reality systems," Proceedings of the 1997 symposium on Interactive 3D graphics, I3D '97, New York, NY, USA, ACM, pp. 1-7 (1997).
Jerald et al., "Scene-motion thresholds during head yaw for immersive virtual environments," ACM Transactions on Applied Perception (TAP), vol. 9, No. 1 p. 4:1-4:23 (2012).
Jerald et al., "Sensitivity to scene motion for phases of head yaws," Proceedings of the 5th symposium on Applied perception in graphics and visualization, pp. 155-162, ACM, (2008).
Jinwei Gu et al., "Coded rolling shutter photography: Flexible space-time sampling," 2010 IEEE International Conference on Computational Photography (ICCP), pp. 1-8 (Mar. 2010).
Jones et al., "Achieving Eye Contact in a One-to-Many 3D Video Teleconferencing System," ACM Transactions on Graphics, 28(3), pp. 1-8 (Jul. 2009).
Kelley et al., "Hardware accelerated rendering of csg and transparency," Proceedings of the 21st annual conference on Computer graphics and interactive techniques, SIGGRAPH '94, pp. 177-184, New York, NY, USA, ACM, pp. 1-8 (1994).
Kelshikar et al., "Real-time Terascale Implementation of Tele-immersion," Computational Science—ICCS 2003, vol. 2660, pp. 33-42 (Jun. 2003).
Lincoln et al., "Animatronic shader lamps avatars," Proceedings of the 2009 8th IEEE International Symposium on Mixed and Augmented Reality, ISMAR '09, pp. 27-33, Washington, DC, USA, IEEE Computer Society, (2009).
Lincoln et al., "Multi-view lenticular display for group teleconferencing," Proceedings of the 2nd International Conference on Immersive Telecommunications, IMMERSCOM '09, pp. 22:1-22:8, ICST, Brussels, Belgium, Belgium, Institute for Computer Sciences, Social-Informatics and Telecommunications Engineering,. (2009).
Maimone et al., "A first look at a telepresence system with room-sized real-time 3d capture and life-sized tracked display wall," 2011 21st International Conference on Artificial Reality and Telexistence (ICAT), pp. 1-6 (Nov. 2011).
Maimone et al., "Encumbrance-free telepresence system with real-time 3d capture and display using commodity depth cameras," 2011 10th IEEE International Symposium on Mixed and Augmented Reality (ISMAR), pp. 1-10 (Oct. 2011).
Maimone et al., "General-purpose telepresence with head-worn optical see-through displays and projector-based lighting," To appear in: IEEE Virtual Reality 2013, pp. 1-10 (Mar. 2013).
Maimone et al., "Computational Augmented Reality Eyeglasses," Mixed Augmented Reality (ISMAR), 2013 IEEE International Symposium, pp. 1-10 (2013).
Mark et al., "Post-rendering 3d warping," Proceedings of the 1997 symposium on Interactive 3D graphics, I3D '97, pp. 7-16, New York, NY, USA, ACM (1997).).
Muehlmann et al., "A new high speed CMOS camera for real-time tracking applications," Proceedings of the 2004 IEEE International Conference on Robotics and Automation (ICRA '04), vol. 5, pp. 5195-5200, (Apr.-May 1, 2004).
Murase et al., "Visual learning and recognition of 3-d objects from appearance," Int. J. Comput. Vision, vol. 14, No. 1, pp. 5-24, (Jan. 1995).
Nakamura, "Image Sensors and Signal Processing for Digital Still Cameras," CRC Press, Inc., Boca Raton, FL, USA, pp. 1-321(2005).
Nashel et al., "Random hole display: A non-uniform barrier autostereoscopic display," 3DTV Conference: The True Vision—Capture, Transmission and Display of 3D Video, 2009, pp. 1-4, (May 2009).
Neumann et al., "A vision of telepresence for medical consultations and other applications," Proceedings of the Sixth International Symposium on Robotics Research, pp. 1-7, (Oct. 1993).
Newcombe et al., "Live dense reconstruction with a single moving camera," 2010 IEEE Conference on Computer Vision and Pattern Recognition (CVPR), pp. 1-8 IEEE, (2010).
Niimi et al., "A parallel processor system for three-dimensional color graphics," SIGGRAPH Comput. Graph., vol. 18, No. 3, pp. 67-76, (Jan. 1984).
Non-Final Office Action for U.S. Appl. No. 14/401,833 (dated Oct. 28, 2016).
Non-Final Office Action for U.S. Appl. No. 14/401,833 (dated Dec. 14, 2015).
Notification of Transmittal of the International Search Report and the Written Opinion of the International Searching Authority, or the Declaration for International Application No. PCT/US2014/026349 (dated Jul. 28, 2014).
Notification of Transmittal of the International Search Report and the Written Opinion of the International Searching Authority, or the Declaration for International Application No. PCT/US2013/041614 (dated Aug. 27, 2013).
Olano et al., "Combatting rendering latency," Proceedings of the 1995 symposium on Interactive 3D graphics, I3D '95, New York, NY, USA, ACM, pp. 19-204 (1995).
Parker et al., "Optix: A general purpose ray tracing engine," ACM Transactions on Graphics, pp. 1-13 (Aug. 2010).
Pollefeys et al., "Detailed real-time urban 3d reconstruction from video," International Journal of Computer Vision, vol. 78, No. 2, pp. 1-43 (2008).
Pollefeys et al., "Self-calibration and metric reconstruction inspite of varying and unknown intrinsic camera parameters," International Journal of Computer Vision, vol. 32, No. 1, pp. 1-18 (1999).
Pollefeys et al., "Visual modeling with a hand-held camera," International Journal of Computer Vision, vol. 59, No. 3, pp. 1-52 (2004).
Pool et al., "An energy model for graphics processing units," 2010 IEEE International Conference on Computer Design (ICCD), pp. 409-416, (Oct. 2010).
Pool et al., "Energy-precision tradeoffs in mobile graphics processing units," Proc. Int. Conf. Computer Design (ICCD), p. 60-67, (2008).

(56) References Cited

OTHER PUBLICATIONS

Pool et al., "Lossless compression of variable-precision floating-point buffers on GPUs," Proc. Symposium on Interactive 3D Graphics (I3D), pp. 47-54 (Mar. 9-11, 2012).
Pool et al., "Power-gated arithmetic circuits for energy-precision tradeoffs in mobile graphics processing units," Journal of Low-Power Electronics (JOLPE), vol. 7, No. 2, pp. 1-44 (2011).
Pool et al., "Precision selection for energy-efficient pixel shaders," Proc. High Performance Graphics, ACM, pp. 159-168 (Aug. 5-7, 2011).
Raguram et al., "A comparative analysis of RANSAC techniques leading to adaptive real-time random sample consensus," Computer Vision—ECCV 2008, pp. 500-513, (2008).
Rolland et al., "Optical versus video see-through head-mounted displays," Medical Visualization, Presence: Teleoperators and Virtual Environments, pp. 287-309, (2000).
State et al., "Simulation-Based Design and Rapid Prototyping of a Parallax-Free, Orthoscopic Video See-Through Head-Mounted Display," Proceedings of the Fourth IEEE and ACM International Symposium on Mixed and Augmented Reality, pp. 1-4 (Oct. 2005).
Steinhurst et al., "Global Importance Sampling of Glossy Surfaces Using the Photon Map," IEEE Symposium on Interactive Ray Tracing, pp. 1-6 (2006).
Steinhurst et al., "Practical Photon Mapping in Hardware," PhD Dissertation, pp. 1-178 (2007).
Steinhurst et al., "Reducing Photon Mapping Bandwidth by Query Reordering," IEEE Transactions on Visualization and Computer Graphics, vol. 14, No. 1, pp. 13-24, (2008).
Steinhurst et al., "Reordering for Cache Conscious Photon Mapping," Proceedings of Graphics Interface, pp. 1-8 (2005).
Watkins, "A real time visible surface algorithm," PhD Thesis, Order No. AAI7023061, pp. 1-214 (1970).
Yang et al., "Differential camera tracking through linearizing the local appearance manifold," IEEE Conference on CVPR'07, pp. 1-8 (2007).
Ye et al., "A Practical Multi-Viewer Tabletop Autostereoscopic Display," 2010 9th IEEE International Symposium on Mixed and Augmented Reality (ISMAR), pp. 1-10 (Oct. 2010).
Non-Final Office Action for U.S. Appl. No. 14/401,833 (dated Oct. 6, 2017).
Non-Final Office Action for U.S. Appl. No. 16/008,682 (dated Oct. 5, 2018).
Notification of Transmittal of the International Search Report and the Written Opinion of the International Searching Authority, or the Declaration for International Application No. PCT/US2015/058959 (dated Mar. 3, 2016).
Pasman et al., "Accurate overlaying for mobile augmented reality," Computers & Graphics, vol. 23, No. 6, pp. 875-881 (1999).
Applicant-Initiated Interview Summary for U.S. Appl. No. 14/401,833 (dated Dec. 17, 2018).
Notice of Allowance and Fee(s) Due for U.S. Appl. No. 16/008,682 (dated Apr. 23, 2019).
Notice of Allowance and Fee(s) Due for U.S. Appl. No. 14/401,833 (dated Mar. 25, 2019).

\* cited by examiner

MINIMAL-LATENCY TRACKING AND DISPLAY FOR MATCHING REAL AND VIRTUAL WORLDS IN HEAD-WORN DISPLAYS

PRIORITY CLAIM

This application claims the priority benefit of U.S. Provisional Patent Application Ser. No. 62/075,221, filed Nov. 4, 2014, which is incorporated by reference herein in its entirety.

GOVERNMENT INTEREST

This invention was made with government support under Grant Number IIS-1423059 awarded by the National Science Foundation. The government has certain rights in the invention.

TECHNICAL FIELD

The subject matter described herein relates to methods and systems for providing augmented reality devices. More particularly, the subject matter described herein relates to minimal-latency tracking and display for matching real and virtual worlds in head-worn displays.

BACKGROUND

For the past two decades, researchers have demonstrated the promise of augmented reality (AR) to allow society to reach new levels of capability and efficiency in areas as diverse as medicine [22], manufacturing [5], maintenance [17], navigation [16], and telepresence [51]. Although to date this technology has been primarily confined to the lab, new advances in mobile processors, sensors and displays offer the promise of mainstream use of AR. In particular, optical see-through head mounted displays (HMDs) offering augmented overlays over one's natural vision are beginning to become practical.

FIG. 1 illustrates several optical see-though glasses models that would benefit from the systems and methods described herein. The formerly bulky designs and narrow fields of view are being superseded by high-performance devices in comfortable and compact form factors that approach those of ordinary eyeglasses such as those shown in FIG. 1. However, such systems still cannot offer augmented imagery registered to real-world objects due to a fatal flaw—latency.

FIG. 1 illustrates various optical see-through glasses that can approach the form factor of ordinary eyeglasses, enabling extended use and mobile augmented reality applications. The left hand image in FIG. 1 is the Google Glass display. The center image is the Lumus DK-32 display. The right image illustrates a future augmented reality glasses concept with multiple integrated tracking cameras.

Optical see-through displays offer a direct and undegraded view of the real environment that is suitable for extended use throughout one's daily activities. However, this desirable attribute comes at a cost; unlike video see-through displays, which allow synchronization of real and virtual objects in software through a combined video signal, optical see-through designs must rely on very low display latency to keep the virtual and real aligned [62]. The latency of today's AR systems, even those optimized for low latency, extends beyond a simple annoyance or distraction and renders many optical see-through applications unusable (see FIG. 2).

FIG. 2 illustrates simulation of latency for a surgery application with an augmented reality overlay of organs. The images show scalpel location and corresponding location of augmented reality overlay that should appear under the scalpel. The displacement of the augmented reality imagery from the scalpel imagery is due to the latency of the tracked head movement for a head moving at a moderate speed of 50°/sec with imagery at arms length (60 centimeters). The left image shows 100 ms latency, typical of an ordinary AR system. The middle image shows 50 ms latency, typical of an AR system designed for low latency. The right image shows 1 ms latency, the expected performance of the design described herein. 1 ms latency assumes a 60 Hz camera update rate for a 1,000 line camera and a total budget of 60 scanlines latency for camera acquisition, tracking, rendering, and display.

Unfortunately, latency occurs throughout all components of an AR system and thus is not easy to reduce [36]. Tracking cameras process data in whole-frame intervals and apply processing to reduce the effects of rolling shutters. Modern graphics hardware uses deep pipelines to achieve high performance in exchange for increased latency, and video image scanout uses one or more frame buffers to prevent image tearing. Displays provide on-board image scaling and enhancement which introduce additional delays. The sum of these latencies typically reaches several frames.

Accordingly, in light of these disadvantages associated with conventional AR systems, there exists a need for minimal-latency tracking and display for matching real and virtual worlds in head-worn displays.

SUMMARY

According to one aspect, the subject matter described herein includes a system for minimal-latency tracking and display for matching real and virtual worlds in head-worn displays. The system includes a display module for displaying a projected image to a user, a rendering module for calculating a desired image, and a processing module for calculating a user-perceived image based on the projected image and a perception model. The processing module receives from the rendering module the desired image, calculates an error image as the difference between the desired image and the user-perceived image, identifies as an error portion a portion of the error image, and updates a portion of the projected image that corresponds to the error portion.

According to another aspect, the subject matter described herein includes a method for minimal-latency tracking and display for matching real and virtual worlds in head-worn displays. The method includes calculating a user-perceived image based on a projected image and a perception model, calculating a desired image, calculating an error image as the difference between the desired image and an image currently being perceived by a user, identifying as an error portion a portion of the error image, and updating a portion of a projected image that corresponds to the error portion.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for minimal-latency tracking and display for matching real and virtual worlds in head-worn displays are provided. The subject matter described herein includes a new method of reducing latency that takes advantage of the principles of bufferless input/output and "minimal-latency" processing throughout all main components of an AR system: tracking, rendering and display. Tracking will take advantage of the native line-sequential exposure (or "rolling shutter") of the inexpensive CMOS cameras found in mobile devices; each new line read out of such a camera produces a new one-line "snapshot" of the scene. When a new data line arrives from a cluster of such cameras in various orientations, it will be fed immediately to an efficient tracking algorithm to provide a new estimate of the user's pose. At the same time, a minimal-latency cascade of successively simpler and faster renderers and warpers will draw the augmented scene, reflecting the most recent tracking pose. Each of these components will be designed to operate flexibly at independent rates, with the goal of minimizing the time between when a tracking observation is made and when the scene data relying on that observation is displayed.

Reference will now be made in detail to exemplary embodiments of the present invention, examples of which are illustrated in the accompanying drawings. Wherever possible, the same reference numbers will be used throughout the drawings to refer to the same or like parts.

Figure 1:
FIG. 1 illustrates several optical see-though glasses models that would benefit from the systems and methods described herein.
Figure 1:
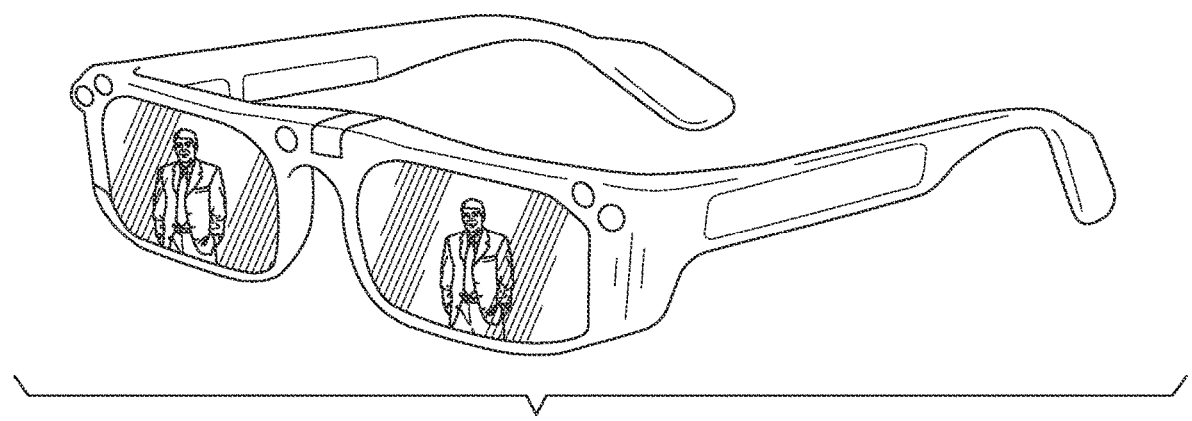
Figure 2:
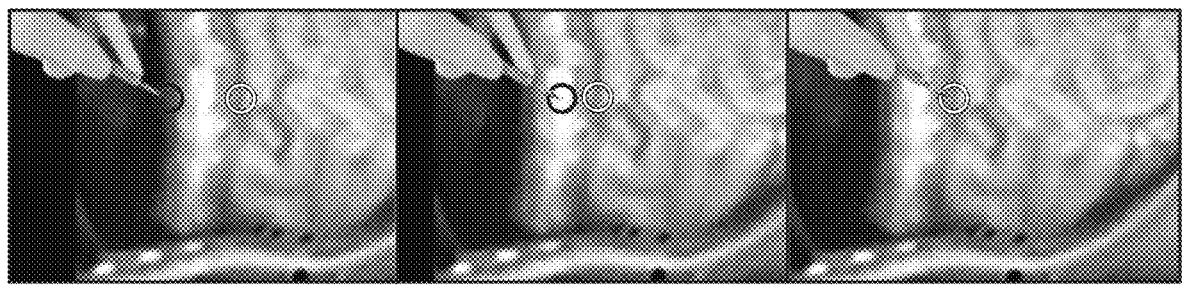
FIG. 2 shows the results of a simulation of latency for surgery with augmented reality overlay, showing the unacceptable latency that is characteristic of prior art approaches.

FIG. 2 shows the results of a simulation of latency for surgery with augmented reality overlay, showing the unacceptable latency that is characteristic of prior art approaches. As shown in FIG. 2, we estimate that an end-to-end latency of ~1 ms is necessary to keep real and virtual objects nearly aligned under moderate head movement (50l sec). Using a 60 Hz, 1000 line camera, we expect that 1 ms latency is achievable with our approach. 1 ms will allow for a total budget of 60 scanlines of latency for camera acquisition, tracking, rendering, and display.

Using this approach, one can design and build a complete AR system based on modified commodity hardware: a cluster of tracking cameras, a computing platform, and an optical see-through HMD. Such a system can operate with extremely low latency—an unprecedented 1-2 orders of magnitude below existing systems—thus removing a significant barrier to the deployment of many AR applications. Such a system can facilitate more widespread adoption of AR, allowing the public to realize the many anticipated benefits of augmented reality.

2 Minimal-Latency Visual Tracking

In order for augmented reality to be convincing to the user, robust and reliable tracking of the camera (and thus user and HMD motion) is provided. While robust tracking alone is sufficient for video augmentation, targeted optical see-through systems also need very low end-to-end system latency to achieve high-quality augmentation. In environments that are not instrumented, a natural choice is the inside-out tracking with wearable (HMD-mounted) cameras. For camera-based tracking, a natural boundary on the system latency is given by the frame rate of the camera, i.e. the system latency is at least as big as the time between frames. The subject matter described herein takes advantage of the fact that rolling shutter cameras provide a high-frequency sampling of the scene on a per-image-row basis.

We use a novel high-frequency, low-latency tracking approach that leverages the rolling shutter present in modern CMOS cameras. This approach is described in detail in commonly owned International Patent Application Serial No. PCT/US14/26349, filed on Mar. 13, 2014, and hereby incorporated by reference in its entirety. For typical high-definition (HD) cameras, this approach can theoretically reach sampling rates of 30 kHz. In practice, sampling rates in the range of a few kHz are common. As the presented tracking is incremental in nature, we combine it with a global visual mapping approach to overcome the inherent drift of the incremental approach.

Next, we review "rolling shutter" cameras and their tracking-relevant characteristics.

2.1 the Rolling Shutter

In traditional CCD sensors (and global shutter cameras in general), all rows of pixels within a frame begin exposure at the same time. For each frame, all rows of the frame begin integration at the same time. Based upon the exposure settings, all rows conclude integration at the same time. Next, the image is read out line by line to the host device and integration begins again for the next frame. In contrast, typical CMOS image sensors commonly found in handheld devices. Instead, these sensors employ rolling shutters [47].

A rolling shutter causes each row of a frame to begin its exposure process at a slightly later time than the previous row. Hence each row of the resulting image can be considered a "snapshot" of the scene at a slightly different point in time; for moving cameras, the scene is at a different spatial position and orientation when each row is exposed. As soon as a rolling shutter has finished exposing a particular row of pixels, that row is read out into line memory [24]. By considering multiple samples from a rolling shutter image, our method leverages temporally uniform distributed appearance sampling of the scene to achieve KHz-rate tracking with low latency.

2.2 Related Work in Camera Tracking

Tracking camera motion using video is a well-established research area in computer vision [54, 55, 53] and robotics [11, 12, 52], and it is frequently leveraged by AR systems for pose estimation. There are two groups of tracking classes: the first class of methods uses sparse salient features for camera motion estimation [55], while the second directly uses the global scene appearance.

The salient-feature-based methods deploy tracking or matching of the salient sparse features in the image to compute the camera position from the feature motion (often termed structure from motion). Alternatively, simultaneous localization and mapping (SLAM) is used to obtain the camera position through a filtering approach [11]. The feature-based methods have been shown to allow real-time tracking at frame rate through fast RANSAC [18] techniques, such as our real-time RANSAC [61]. However, these techniques require the full frame to be present at motion estimation time, so the tracking latency is at least as long as it takes to acquire one frame from the camera.

The systems and methods described herein fall in the second class of appearance-based tracking. These methods use global image appearance to formulate the tracking problem in the camera parameters [30, 26]. Murase and Nayar [48] project the appearance into a hyperspace parameterized in the illumination and object position; this requires object segmentation and illumination determination techniques. Other methods represent objects in separate linear subspaces for different illuminations [4, 25, 3] to overcome the illumination constancy requirement. However, these methods require non-scalable efforts to obtain the linear subspaces or offline learning processes [14]. Our method overcomes all of these restrictions by simultaneously tracking and sampling the local appearance manifold.

2.3 Vision-Based Tracking with a Rolling Shutter

The tracking approach described herein extends our preliminary approach [69], which leverages a local linearization of the appearance manifold of the scene. Similar to our preliminary work, the presented approach performs real-time tracking even in highly complex and irregular scenes. The major drawback of our preliminary approach [69] is the sub-pixel motion restriction; our presented approach overcomes this limitation through high-frequency rolling shutter sampling.

A scene's appearance manifold is spanned by the scene appearance as captured by the images under the possible camera positions and orientations. Each image is considered to be a vector $I \in R^n$ that contains all its n pixels color values. The camera is considered to have six degrees of freedom for its motion and if it moves through the scene capturing images $I_t$, it samples the appearance manifold of the scene under the current illumination. Given that the camera has only six degrees of freedom, the appearance manifold can at most have dimensionality six. In addition, it is clear that a mapping f(•) from the camera parameters P to the appearance manifold or images I exists. The mapping f(•) allows us to obtain the image I=f(P) from the camera parameters, if the appearance manifold of the scene is known.

It is likely that the appearance manifold of a scene is highly non-linear, requiring a large number of samples in order to obtain the appearance manifold of the scene [48, 4, 25, 3], but learning the full appearance manifold is infeasible for an AR system that is deployed in unconstrained environments. Our approach exploits a locally linear representation of the appearance manifold along with an efficient method to track the camera motion and re-learn the local appearance manifold.

To linearize the local appearance manifold, consider a camera $P_0$ at time t, which acquires image $I_0$: it can be assumed that m nearby images $I_{0 \ldots m-1}$ also taken at time t from perturbed camera positions $P_{1 \ldots m}$ are known. The local appearance manifold I(P) for $P_0$ can be linearized using the camera samples k=1 ... m as follows:

$$I_k = I_0 + \underbrace{\frac{\partial I(P)}{\partial P}}_{F}\left(\frac{P_k - P_0}{dP_k}\right) \tag{1}$$

$$dI_k = FdP_k$$

with image I seen as n-dimensional vectors containing the pixels of the image and $dI_k$ being the difference of image $I_0$ to $I_k$ in vector form. $P_k$ is the six-dimensional camera pose parameter vectors and dP is the difference vector between $P_0$ and $P_k$. F represents the linearized appearance manifold and is equivalent for all samples. For each particular appearance sampler, Equation (1) is underdetermined to solve for the change dP, but the constraints of all m views can be combined to $$[dI_1, \ldots, dI_m] = F[dP_1, \ldots, dP_m] \tag{2}$$

If the m images provide six linearly independent constraints, Equation (2) can be solved as a least squares problem. To maximize applicability, in one embodiment the number of images is reduced to a minimum m=6 to recover the camera motion of a new image $\tilde{I}_0$ by solving $$Fd\tilde{P} = d\tilde{I}_0 \text{ with } F = [dI_1, \ldots dI_m][dP_1, \ldots, dP_m]^{-1} \tag{3}$$

where $d\tilde{I}_0$ is the difference image between image $I_0$ at time t and the new image $\tilde{I}_0$ at time t+1. This provides the incremental camera motion $d\tilde{P}$ through a linear solution of Equation (3) if the m=6 views span the local linearized appearance manifold F. One approach to obtain those six views will now be described.

In practice it is expected that {r} will contain a single row or a few tens of rows at most. Using fractions of the image to track the differential motion enables our presented method to track with a sampling rate s of $$S = \frac{\#(\text{rows})(\text{camera frame rate})}{|\{r\}|} \tag{4}$$

Equation (4) reveals that megapixel-sized images would allow s to be in the kHz range.

In preliminary work [69], we used three auxiliary cameras offset in the x-, y- and z-directions to obtain three samples in orthogonal directions. Three rotated views can be generated by virtually rotating each camera's image around the three axes of the coordinate system. For non-degenerate scenes, these images provide the constraints needed to estimate the differential camera motion $d\hat{P}$.

Figure 3:
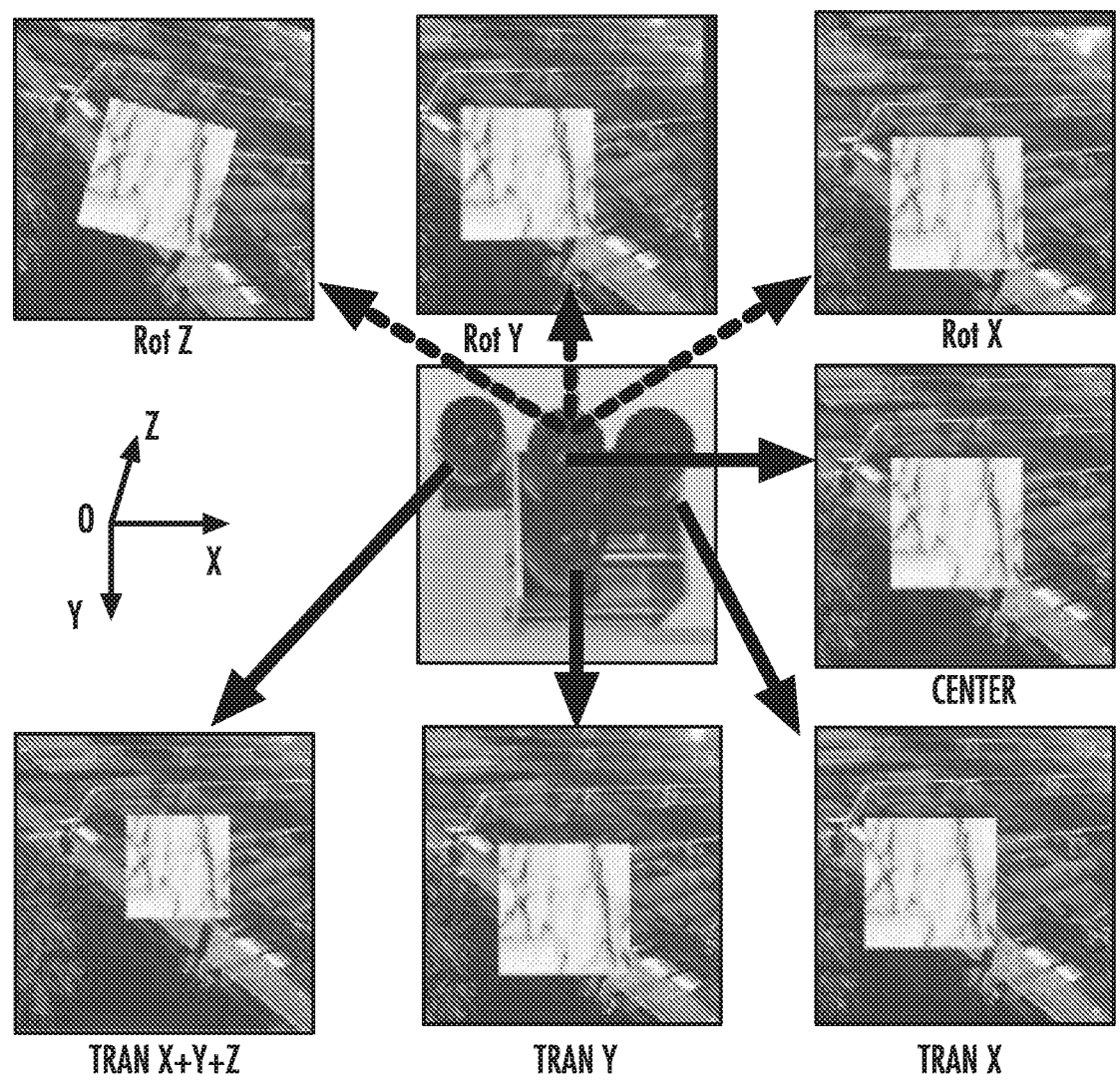
FIG. 3 shows an exemplary tracking camera cluster according to an embodiment of the subject matter described herein.

FIG. 3 shows an exemplary tracking camera cluster according to an embodiment of the subject matter described herein. FIG. 3 shows an example of our preliminary system and the images obtained.

In particular, the center image in FIG. 3 shows the tracking camera cluster, and the images that surround the center images show images captured by the camera at various camera rotations and translations.

In some cases of fast camera motion (e. g. head motion), the sub-pixel motion constraint is not upheld. In these extreme motion conditions, we exploit the observation of Forsse and Ringaby's [19] analysis of motion artifacts for rolling shutter cameras: the major source of image motion between frames is camera rotation. When estimating the motion of the camera from the set of rows $\{r\}$, we know the estimated motion of the previous set of rows. This motion estimate can then be used to compensate for the rotational motion by incorporating the prediction into Equation (3):

$$F_R^{\{r\}} d\hat{P} = d\tilde{I}_{R0}^{\{r\}}, \text{with}$$

$$F_R^{\{r\}} = [((I_k - H_{R_0} I_0)^{\{r\}}, \ldots, (I_k - H_{R_{m-1}} I_0)^{\{r\}}][dP_0, \ldots, dP_{m-1}]^{-1} \quad (5)$$

Eliminating almost all rotational image motion ensures that a large range of motions fulfill the sub-pixel motion constraint, enabling our system to track in almost all practical scenarios.

Tracking Drift.

Given the incremental approach of the presented appearance-based tracking method, integration of accumulated errors will lead to drift over time. Our method only accumulates frame-to-frame error and does not accumulate the tracking errors over the multiple sets of rows $\{r\}$ in the image. In one embodiment, the effects of frame-to-frame drift are mitigated by coupling our appearance-based tracker with a global tracker that uses traditional structure-from-motion methods to serve as an absolute reference. In one embodiment, the presented tracker may be combined with one of our previously described methods [6] at frame rate. This will suppress the frame-to-frame drift by using salient environment features to determine a global camera pose.

Accuracy of Rolling Shutter Tracking.

Figure 4:
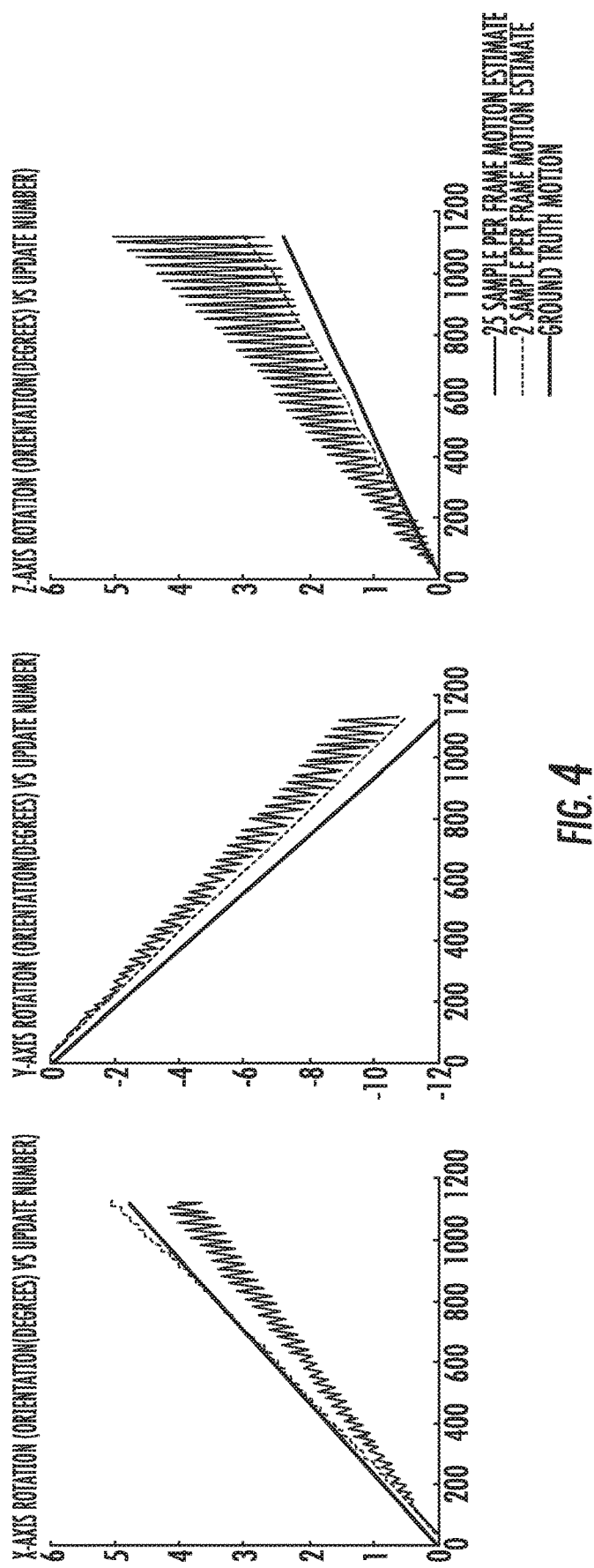
FIG. 4 illustrates graphs of the performance of a fast tracking algorithm according to an embodiment of the subject matter described herein.

Performing the presented rolling shutter tracking technique on synthetic data yields encouraging results, with one caveat: the quality of the results is dependent upon the number of rows used to form each subimage, as illustrated in FIG. 4.

FIG. 4 illustrates graphs of the performance of a fast tracking algorithm according to an embodiment of the subject matter described herein. In particular, FIG. 4 illustrates graphs comparing preliminary results between the ground truth motion, tracking by taking samples per frame (using half of the rows per motion estimate), and tracking with 25 samples per frame (using one twenty-fifth of the frame's rows per motion estimate). For brevity, only the rotation estimates are shown. The translational estimates have similar performance characteristics. FIG. 4 suggests that the rolling shutter tracker produces ringing at speeds of 25 samples per image. In one embodiment, a Kalman filter or similar may be implemented to smooth the tracker's estimates. Regardless, the ringing in the first several hundred measurements after correction is minimal, suggesting that sufficient accuracy at high sampling rates will only be possible if registration-based drift correction is performed at frame rate.

Degenerate Cases.

For the sampling and camera motion computation using full images [69], degenerate cases include far away scenes as they do not provide translational constraints; hence the solution of Equation (2) becomes under-constrained, leaving a three-dimensional family of solutions. Insufficient parallax within a scene will signal our system to adjust the camera motion estimation leveraging Equation (5) to only include 3 rotational degrees of freedom. In one embodiment, a technique to estimate the scene's parallax involves high-frequency optical flow analysis between the system's center camera and each of the translational cameras. An additional degenerate case of only our presented method will be homogenous image rows, which generally do not provide enough constraints except in special spatial configurations.

In summary, in one embodiment, the minimal-latency tracking technique includes implementation of the presented novel single-row or set-of-rows tracking method. A performance evaluation may be performed to determine practically feasible tracking rates s. Such an evaluation may be performed on indoor and outdoor datasets. Drift compensation may be achieved through global mapping and integration of the correction into the AR system such as to avoid visual artifacts. Such systems may implement rotational motion compensation in the tracking, as presented in Equation (5). A mechanism which identifies parallax deficiencies within a scene and adjusts the camera motion estimation leveraging Equation (5) may be included.

3 Realization of Computer Vision Hardware

Systems and methods according to the subject matter described herein utilize each individual row of a frame immediately after it is exposed by the rolling shutter, in order to provide real-time pose estimation by solving Equation (5).

3.1 High-Level Architecture

In order to bring a high-frequency, row-wise rolling shutter motion tracker to fruition, we must stray from today's typical CMOS image sensor controller design. Related previous work ([20]-[49]) assumes that all image sensor addressing, row-wise readout, and exposure control is driven by the image sensor control board. Systems and methods described herein may use instead a lightweight control board which acts as a thin glue layer between the CMOS sensor and the host device. This control board will be responsible for exposing and retrieving rows from the CMOS sensor as rapidly as possible. To minimize the sensor-to-host latency, no image processing is performed by the camera hardware.

By taking such a simplistic approach, the system can remain compact, low-cost, and low-power, fitting the performance profile necessary for a mobile augmented reality system. In one embodiment, the system may use off-the-shelf CMOS image sensors and controllers implemented on FPGA boards. In one embodiment, a custom driver and API for the camera may be developed to enable user-defined programs to grab 'incomplete' frames from the camera. In one embodiment, an integrated controller may be developed for controlling all four cameras in a cluster to enable tracking within an FPGA.

4 Rendering and Display 4.1 Introduction

In addition to tracking latency, rendering and display are the remaining major sources of significant latency in existing AR systems. Even in the absence of tracking and rendering latency, the remaining latency induced by the display results in misregistration that is very noticeable at reasonable object movement. As we have shown in the previous section, the presented scanline-based tracking methods promise update rates of several KHz, perhaps up to 30 kHz. Rendering and display at rates comparable to those of the presented tracking methods are not possible with traditional displays or graphics processors.

Displays combine electronics, mechanics, and optics to generate, modulate, and steer light to viewers' eyes. The number of combinations of available mechanisms is staggering and continues to grow as new technologies emerge. Abstracting these mechanisms as traditional 1930s CRT televisions, i.e. serializing pixel access with regularly spaced raster updates, provides a common interface, but imposes latencies that may not be present in the underlying technologies. Ironically, random access to this serial array is provided through another abstraction, frame buffer memory, which imposes yet another layer of latency. Similarly, today's hardware (GPUs) and software (drivers and graphics APIs) are not designed for minimal latency but rather for highest possible throughput, which they achieve through a combination of parallelism and pipelining. The latter has been a source of increased latency even as it increased frame rates. Often enough the systems buffer an entire frame's worth of data at various pipeline stages. For a 60-Hz display, frame buffering alone induces minimum latency penalties of 16 ms and 33 ms at the top and bottom of the display respectively. As shown in FIG. 2, delays of this (minimal) magnitude can greatly degrade the performance of AR applications. Thus, high frame rates alone are insufficient for achieving dynamic registration in AR applications; they must be accompanied by minimal total display latency, by which we mean the amount of time spent by new data passing through the rendering and display engines until the corresponding updated photons are emitted by the display device.

We present systems and methods to de-abstract the display and its interface to expose low-level mechanics, which permit us to obtain the fastest possible control of photon production by the display. Our graphics processing architecture has a pipelined cascade of successively simpler and faster stages, with the characteristic that each stage may be updated with the most current tracking parameters. This is in contrast to the conventional pipeline, in which scene and viewing parameters are fed to the front end and trickle through the pipeline, accumulating latency at each stage.

In one embodiment, processors have parallel and/or random access to individual pixels. In one embodiment, the rendering process could access independent components of the display in order to, for instance, distribute modulation across both illumination sources and mirrors in a digital micromirror device (DMD) to simultaneously optimize for latency, power, and quality.

4.2 Minimal-Latency Display Elements

Previous work [39] demonstrated high-frequency display updates (over 4,000 low-bit-depth images/sec) with projectors based on the (widely used) DMD technology. We have therefore chosen DMDs as the initial display platform.

The unique features of this readily available DMD technology inspire us to rethink the display of color information. Traditionally, DMD systems have simply used frame-sequential time-multiplexed accumulation of color during the frame time. But since in a low-latency system it is no longer acceptable to let the frame time elapse in order to allow the color data to "build up," we will investigate an approach that we consider suitable for low-latency presentation. The systems and methods according to the subject matter described herein take advantage of the color LED illumination and implement a high-frequency three-LED unit that can display any color (by controlling the intensity of the simultaneously activated LEDs) and can thus change illumination color with each single-scanline update, i.e. at a rate of 25 MHz. For each single-scanline display update, the system will access the one scanline that requires the most significant update in terms of color difference in order to show the user the imagery needed at that particular time. The system will be able to deliver such a "scanline color moment" through both exact illumination color and mirror state changes on the selected target scanline. This concept replaces the traditional "one frame at a time" notion that all current displays are based on.

While alternative technologies such as LCDs or OLEDs feature their own unique properties and require their own control mechanisms, a DMD prototype provides a level of access not readily available in most other displays. However, the general approach presented here can be extended to a wide variety of display technologies.

A rendering process for the above approach maintains an estimate of the image currently presented to the user and continually calculate and assess the difference between that image and the desired current imagery based on the latest tracker readings. In one embodiment, the method includes generation of synthetic images extended past the current field of view of the display, as far as the user can possibly move, in the time until the next complete conventional full-frame rendering becomes available (30 msec). In one embodiment, the method includes tracking the user's gaze and attempting to maintain an image of the display contribution that accumulates on the user's retina. Predicting what exactly our users will perceive and how effective or deleterious any particular display strategy will prove is a daunting task, and to our knowledge, no current or recent immersive display eyewear has explored the issues addressed by the subject matter described herein. Commercial pioneers such as the Google Glass team have likely recognized the difficulty of these issues and have refrained from promising or attempting to deliver registered AR in their first commercial offerings.

4.3 End-to-End Augmented Reality System

Integrating these ideas into a novel end-to-end framework, we present a low-total-latency optical see-through AR system, consisting of a visual tracker as described in Section 2, as well as rendering, post-processing and display as detailed in this Section.

Figure 5:
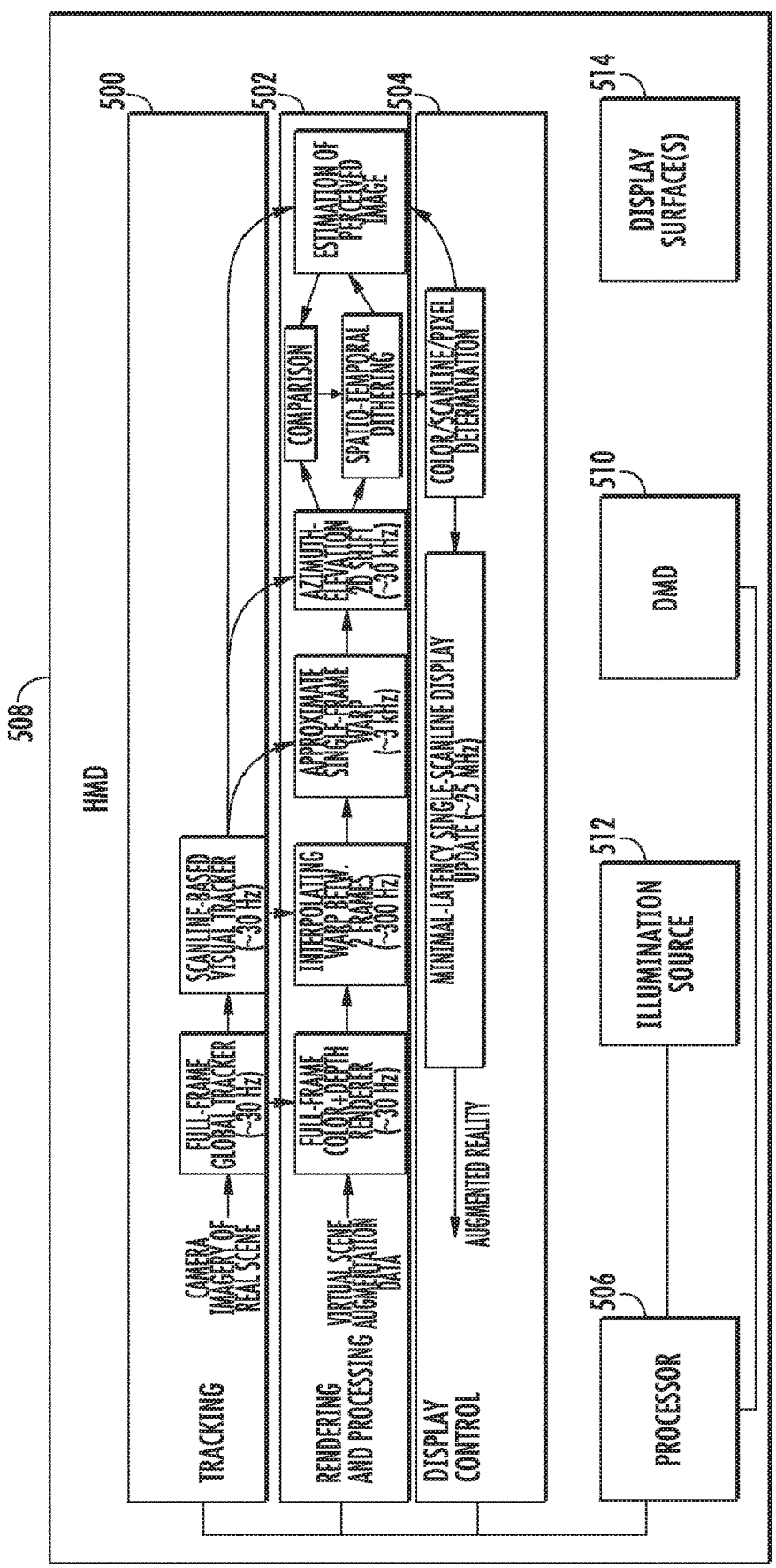
FIG. 5 is a block diagram illustrating an exemplary system for minimal-latency tracking and display for matching real and virtual worlds in head-worn displays according to an embodiment of the subject matter described herein.

FIG. 5 is a block diagram illustrating an exemplary system for minimal-latency tracking and display for matching real and virtual worlds in head-worn displays according to an embodiment of the subject matter described herein. FIG. 5 shows a high-level overview. A tracking module 500, at the topmost layer, delivers viewing transformations (i.e. tracking pose estimates) at up to 30 KHz. In the second layer, a rendering and processing module 502 combines traditional real-time image synthesis generating high-quality color+depth maps (~30 Hz) with a post-rendering 3D warp [46] which interpolates between two color+depth maps, for synthetic image generation at much higher rates (~300 Hz). A third rendering step will perform an even smaller correction, in the form of a single-map warp or a simple image reprojection. The fourth and final rendering step will merely execute a 2D image shift to approximate an orientation-only view correction. Thus, rendering rates comparable with the tracking rates may be achieved. The most recently generated image will be compared with the system's continually maintained estimate of the image currently presented to and perceived by the user. A post-processing unit will produce a sequence of high-frequency 1-bit arbitrary-single-color images using spatio-temporal dithering. In the third layer, illustrated by display control module 504, the scanlines which need updating most are identified and displayed at extreme speed (25 MHz for a single scanline). In the following two subsections, we will discuss rendering, post-processing and display control in details.

4.4 Rendering

For optical see-through AR applications in fields such as medicine and telepresence [21], images can be synthesized using a variety of methods that generate a complete color+depth image. At much faster rates, we will generate through a 3D warp [46] a new image matching an estimated future position. To perform this process efficiently, we will warp only regions of the color-plus-depth map that are within the bounded region representing all possible changes in the viewing transformations across scanlines. Furthermore, we will generate each scanline just before it is sent to the display, by keeping track of the scanline currently being scanned out by the graphics hardware.

Modern desktop GPUs are designed for general-purpose parallel floating point computation, and can thus be adapted to a variety of rendering algorithms; mobile CPUs are increasingly following this trend as well. We also note that we can generally trade off rendering performance for latency by adjusting the number of scanlines that are rendered together with full spatial coherency.

4.5 Rendering Post-Processing and Display Control

Figure 6:
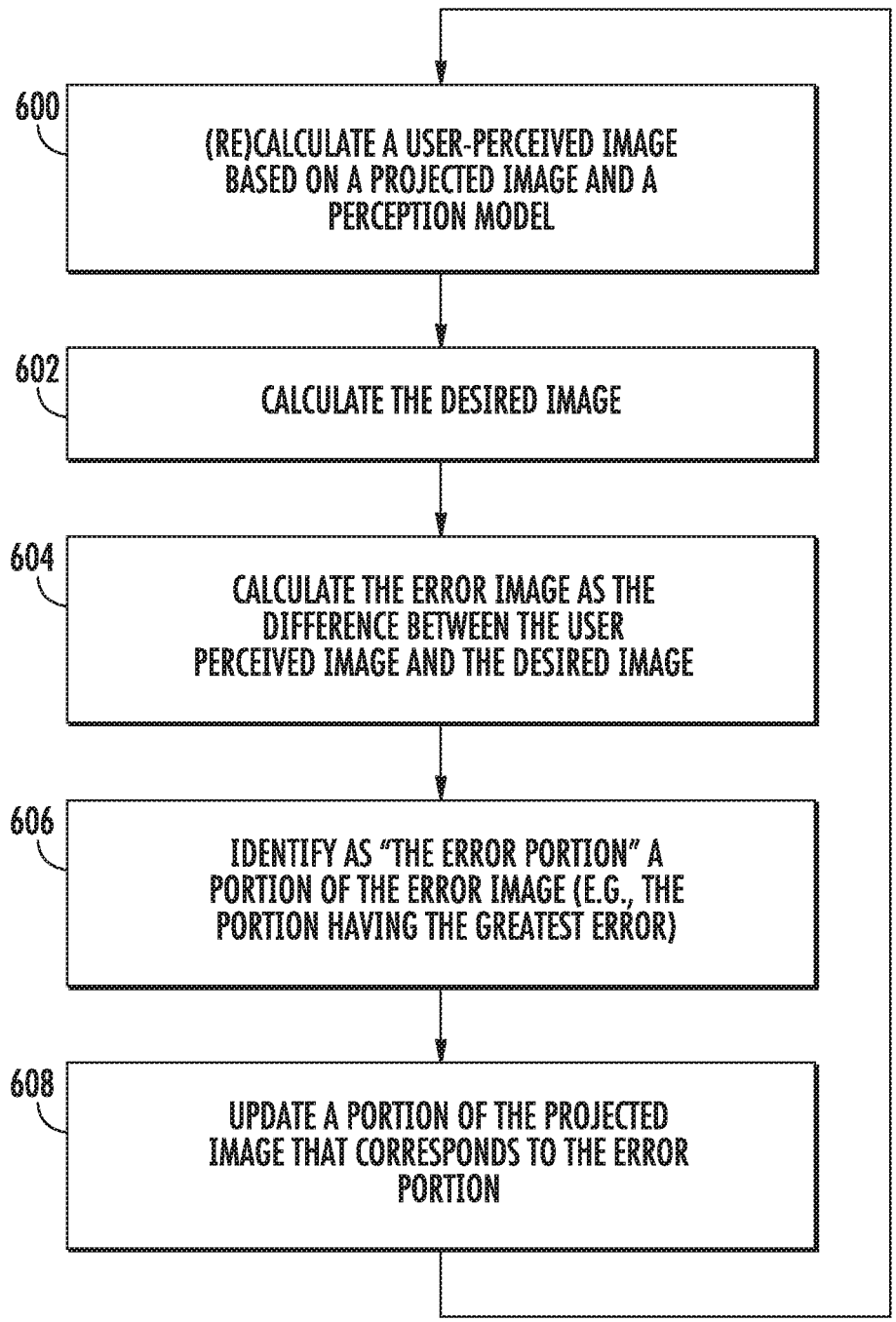
FIG. 6 is a flow chart illustrating an exemplary process for minimal-latency tracking and display for matching real and virtual worlds in head-worn displays according to an embodiment of the subject matter described herein.

FIG. 6 is a flow chart illustrating an exemplary process for minimal-latency tracking and display for matching real and virtual worlds in head-worn displays according to an embodiment of the subject matter described herein.

At step 600, a user-perceived image is calculated based on a projected image and a perception model. The user-perceived image may be calculated based on models of human perception and may take into account not only physiological models of human retinas but also models of brain function that consider human abilities of edge detection and pattern matching, relative importance given to subjects in the visual field based on perceived threat or desirability, etc., as well as models of characteristics of the display hardware or other aspects of the physical system.

At step 602, the desired image is calculated. For example, the desired image may be calculated or based on changes in pose of the wearer of a head mounted display, changes in augmented reality content, or both.

At step 604, the user perceived image is compared to the desired image to calculate the error image. In one embodiment, the user perceived image may be calculated based on persistence of images on the human retina or other physiological factors. Because DMD embodiments display the virtual image on glass, there is no image decay such as is normally associated with CRTs phosphors, LED or OLED segments, and the like. These aspects may be taken into account as part of the calculation of the user perceived image.

At step 606, a portion of the error image ("the error portion") is identified. In one embodiment, the error portion may be identified as the portion of the image having the largest error, but other metrics may be used. Largest error may be defined as largest instantaneous error, largest accumulated error, and so on. In one embodiment, the minimum portion of the image considered may be a row, in which case "the error portion" may be whichever row of the image has the largest collective error. This resolution is suited for display devices which update values on a row-by-row basis, such as a DMD, but other portions (e.g., column, area, portion of row, distributed bit-field, pixel sub-address, etc.) may be used as appropriate for the display technology.

At step 608, a portion of the projected image that corresponds to the error portion is updated. In the case of DMDs, for example, an entire row may be updated. In this example, updating the row may change some mirrors from ON (e.g., reflecting light towards the screen or user's eye) to OFF (e.g., reflecting light away from the screen or user's eye), from OFF to ON, or neither.

The process the returns to step 600, where the user perceived image is (re)calculated based on the updated projection image and the perception model. The process may repeat continually.

The steps illustrated in FIG. 6 may be performed by the components illustrated in FIG. 5. More particularly, display control module 504 may control display of a projected image that includes real world and synthetic elements to a user. Rendering and processing module 502 may calculate a desired image and a user perceived image based on the projected image and a perception model for a user. Rendering and processing module 502 may calculate an error image as the difference between the desired image and the user perceived image, identify as an error, a portion of the error image. Display control module 504 may update a portion of the projected image that corresponds to the error portion. Examples of the projected image, the user perceived image, and the error image are presented in FIGS. 7A-8F.

Tracking module 500, rendering and processing module 502, and display control module 504 may be implemented or executed by one or more processors 506. Processors 506, display control module 504, rendering and processing module 502, and tracking module 500 may be components of a head wearable display 508, such as an eyeglasses mounted optical see-through display. Head wearable display 508 may include a digital micro mirror device (DMD) 510, an illumination source 512 for illuminating the DMD, and one or more projection surfaces 514 for displaying images to the user. In the Google Glass display, projection surface 514 may be one face of a prism that is located optically in front of a wearer's eye for displaying projected synthetic images that are overlaid on the wearer's view of the real world. Illumination source 512 may include color filters for modifying the hue of illumination. In an alternate embodiment, illumination source 512 may be a multicolor illumination source. In one embodiment, illumination source 512 may include light emitting diodes.

As will be explained using examples below, DMDs have binary states, i.e., the mirror is either fully ON or fully OFF, which means that intensity of a perceived image may be adjusted by manipulation of duty cycle of the ON and OFF states. For this reason, even for a static image rows will be continually updated as necessary to produce the desired perceived intensity.

In this manner, after each scanline update is transmitted to the display as quickly as possible, the system will immediately emit "updated" photons. This will be ensured by:

(1) A novel post-processing method which will keep track of the state of the display elements such that the rendering process can determine which parts of the image require updating most urgently—likely by means of a virtual panorama surrounding the user and to which spatio-temporal dithering will be applied in order to calculate said display updates;

(2) An experimental high-speed micromirror based display [1], which provides low-level raw chip access and is capable of updating scanlines (1024 pixels), or fragments thereof, at 25 MHz.

Each pixel's micromirror is either "on" or "off"—that is, angled to reflect the global light source either to the viewer, or into a light-absorbing baffle. In conventional designs, the micromirrors are used in this way, typically with color-sequential illumination and time-multiplexed to accumulate the desired intensity through numerous on-off cycles executed at each pixel and during each 1/60th second frame. In one embodiment, illumination is provided by three-color (red-green-blue) LED illuminators that can be activated simultaneously and with smoothly modulated intensities, thus capable of illuminating the micromirrors at any moment with an arbitrary, controlled color that can change at update rates. Thus, at each display update (up to a full scanline at a time), a new optimal color will be calculated such that the currently active micromirrors or pixels, together with the current update, deliver the most urgently needed incremental contribution. This process is repeated at very high rates, delivering the fastest updates DMDs are capable of.

As mentioned, these high-frequency scanline (or scanline fragment) updates will be calculated by comparing the difference between the image the system wants the user to see and the image it estimates the user is actually seeing. Finally, blank scanlines will of course not be updated at all. As mentioned, the approach described here is very uniquely suited for the rapidly switching, selectively addressable (in small groups such as scanlines) DMDs. Other display technologies, such as Liquid Crystal Displays (LCDs) have higher settling characteristics after state changes. Since DMDs operate many orders of magnitude faster than all other technologies, we focus the presented work on them as the first target, although the principles described herein are not limited to DMDs but may be applied to other technologies as well as appropriate.

FIGS. 7A through 7E illustrate the operation of systems and methods according to an embodiment of the subject matter described herein using a simple graphic image. In each of FIGS. 7A through 7E, the timestamp is displayed at the top of the figure, below which are four images. These four images are, left to right, the desired image, the error image, the projector image, and the user perceived image. Below the four images are two graphs. The graph on the left shows the mean absolute error of the error image. As the user perceived image more closely approximates the desired image, the absolute error should be reduced. If the user perceived image exactly matches the desired image, the mean absolute error should approach zero. The graph on the right displays a row selection histogram, i.e., how often a particular row is updated. In the example illustrated in FIGS. 7A through 7E, the desired image is static, i.e., it does not change or move, but because it is an image having different intensities, it is expected that pixels on the bottom row of the triangular figure will be ON more often than OFF, while the pixels at the top point of the triangular figure will be OFF more often than ON, reflecting the duty ratios required by the micromirrors to approximate varying intensities.

Figure 7A:
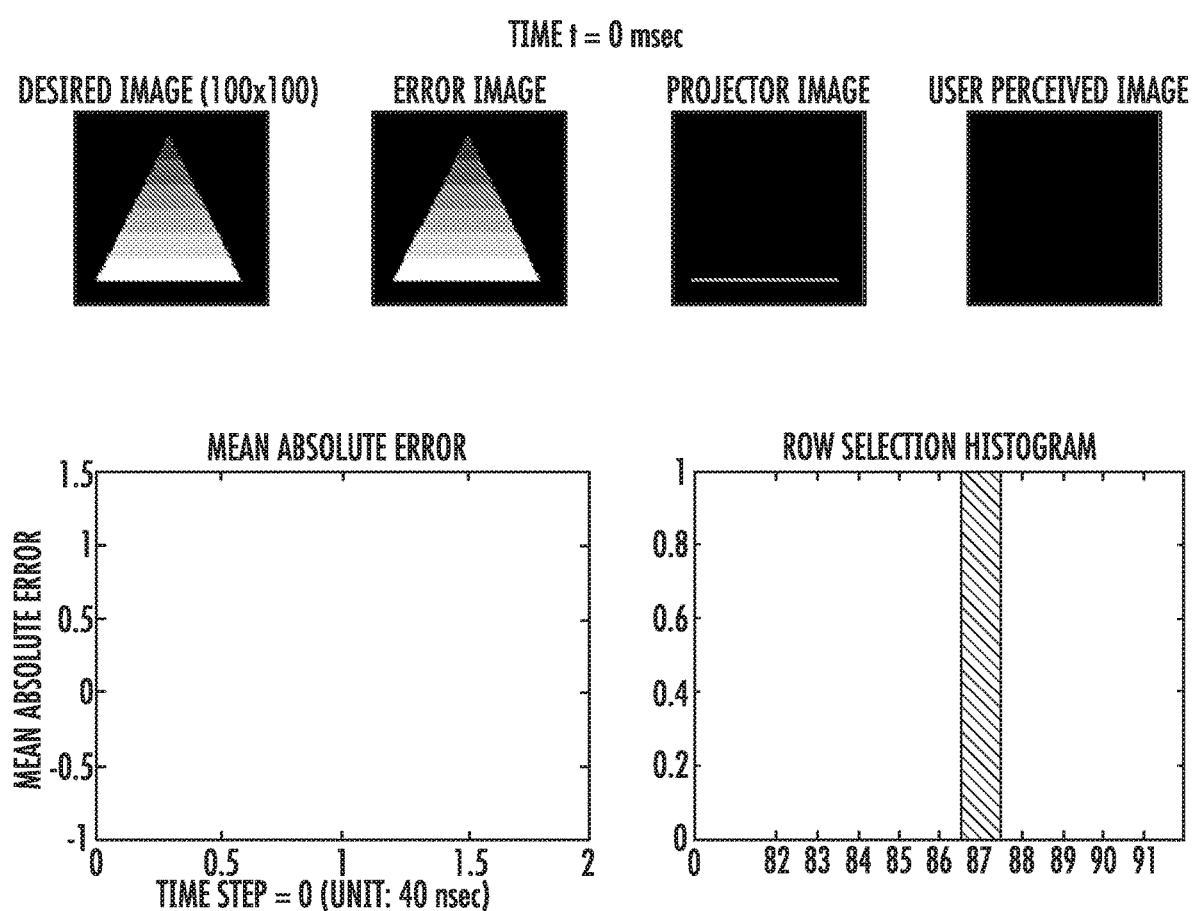
FIGS. 7A through 7E illustrate the operation of systems and methods according to an embodiment of the subject matter described herein using a simple graphic image.

Referring now to FIG. 7A, time=0 ms, meaning that the desired image has just appeared, the user perceived image is blank, and thus the error image is essentially identical to the desired image. As a result of the calculation of error, it can be seen that the row of pixels located at the bottom of the error image (row 87 in the row selection histogram) has been identified as having the largest error value. The pixels in that row were formerly all OFF, so the row update will turn some pixels in that row to ON, as shown in the projector image. Mean absolute error has not yet been calculated.

Figure 7B:
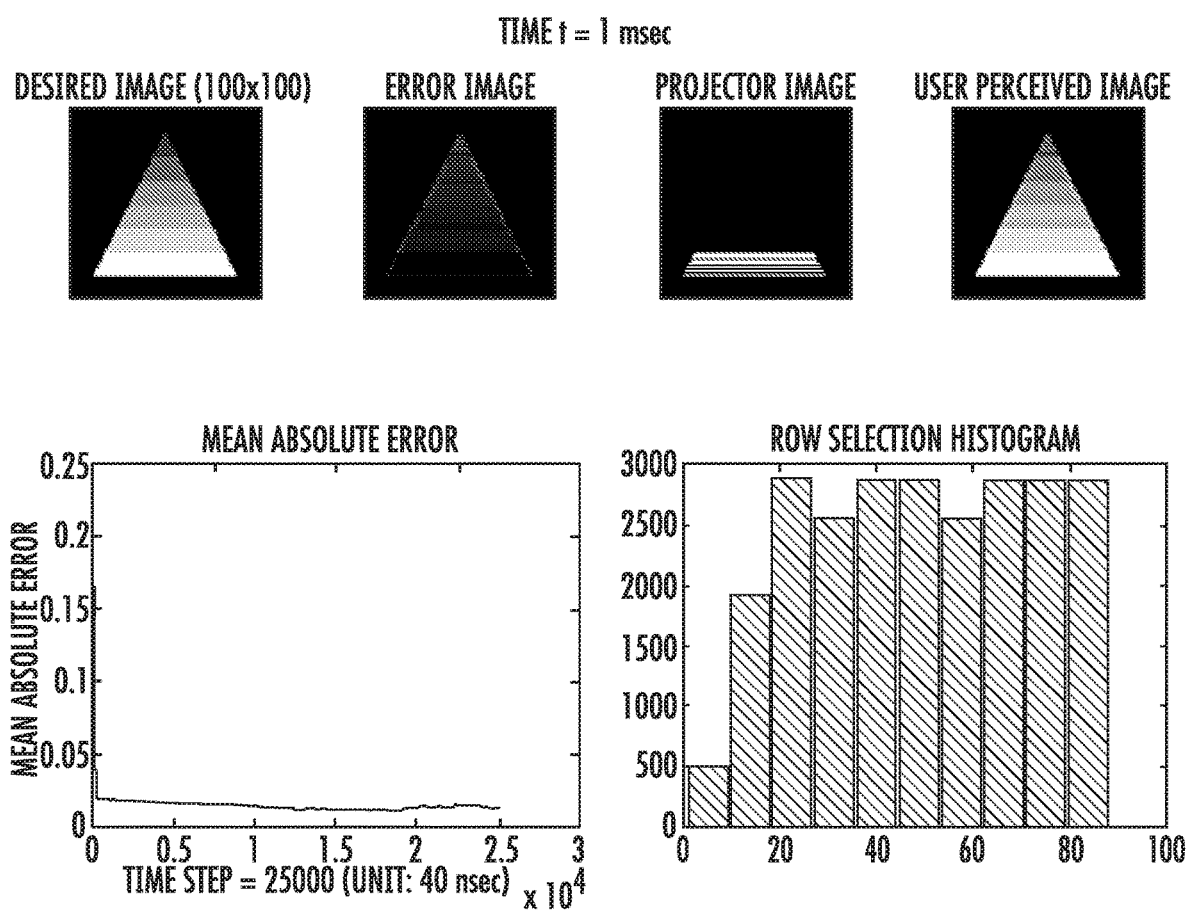

In FIG. 7B, time=1 ms. As can be seen from the row selection histogram, there have been approximately 25,000 row updates within the first millisecond operation, which brought the user perceived image very close to the desired image, as can be seen by the error image, which shows slight errors near the top of the triangular image. The projector image is showing that at this instant in time, several of the lowest rows have pixels that are ON and the remainder of the rows have pixels that are all OFF. The row selection histogram shows that rows near the top of the image, i.e., rows 1-10, are selected least often. The mean absolute error has dropped to below 0.025 within just a few microseconds of operation.

Figure 7C:
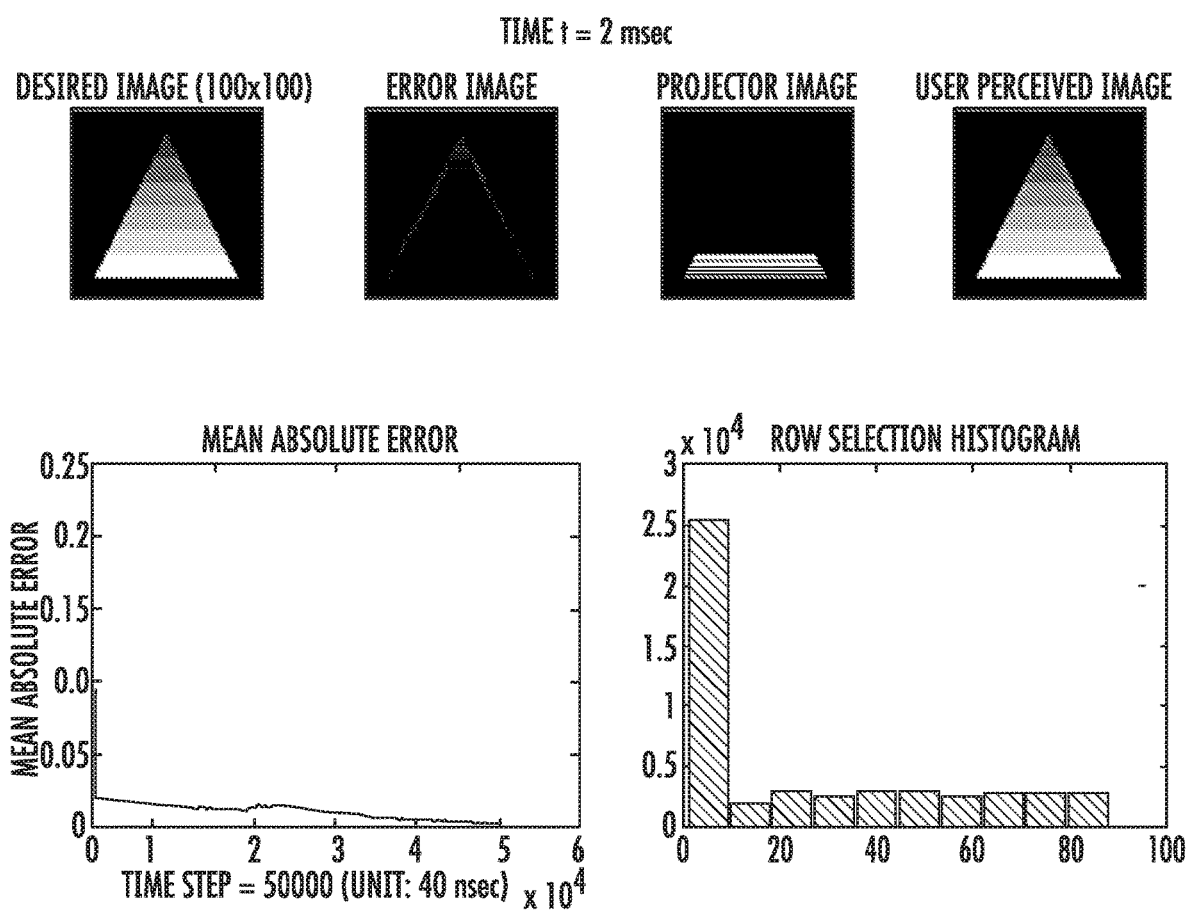

In FIG. 7C, time=2 ms. The user perceived image is almost exactly identical to the desired image, with only very slight error values near the top of the error images. The projector image at this instant of time again happens to show only rows near the bottom of the projector image still having pixels that are ON.

Figure 7D:
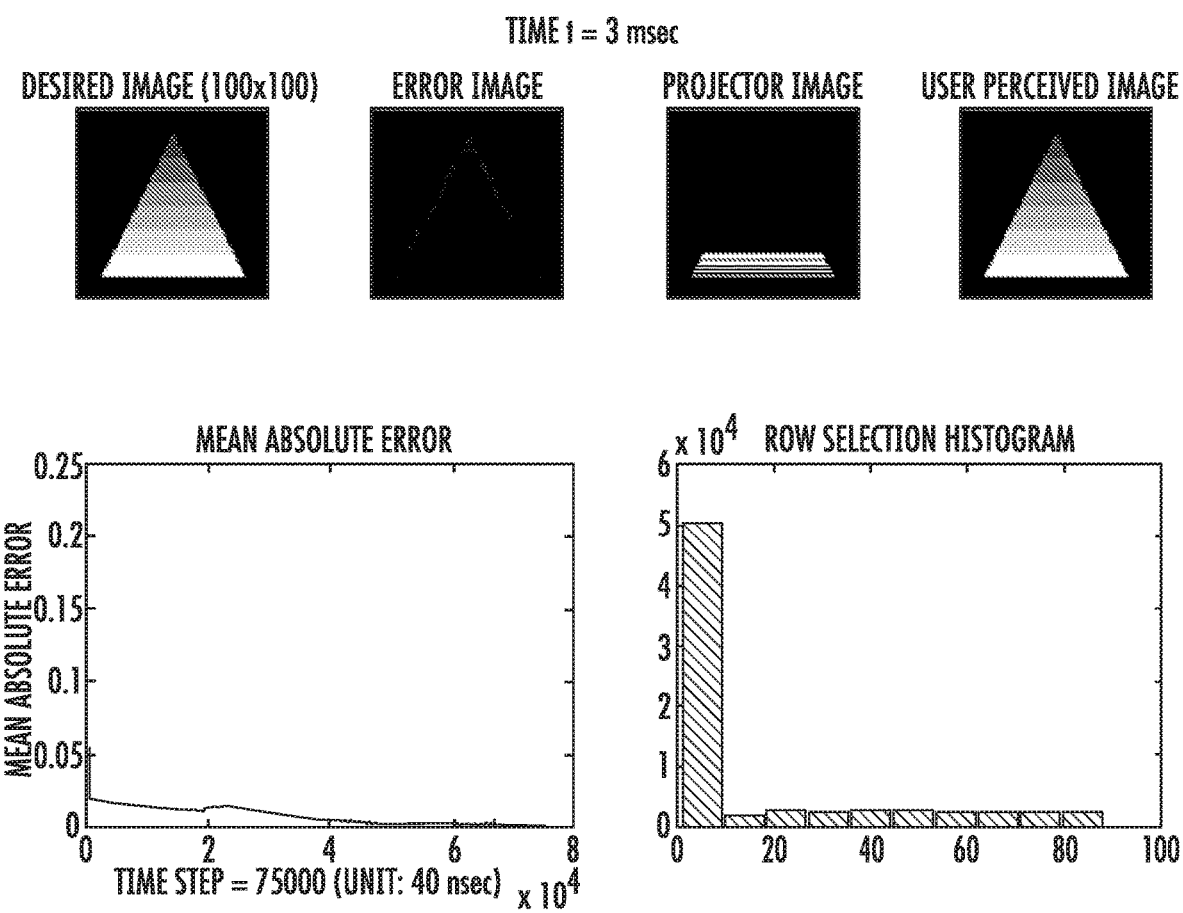

In FIG. 7D, time=3 ms, and the error between the desired image and the perceived image is approaching zero.

Figure 7E:
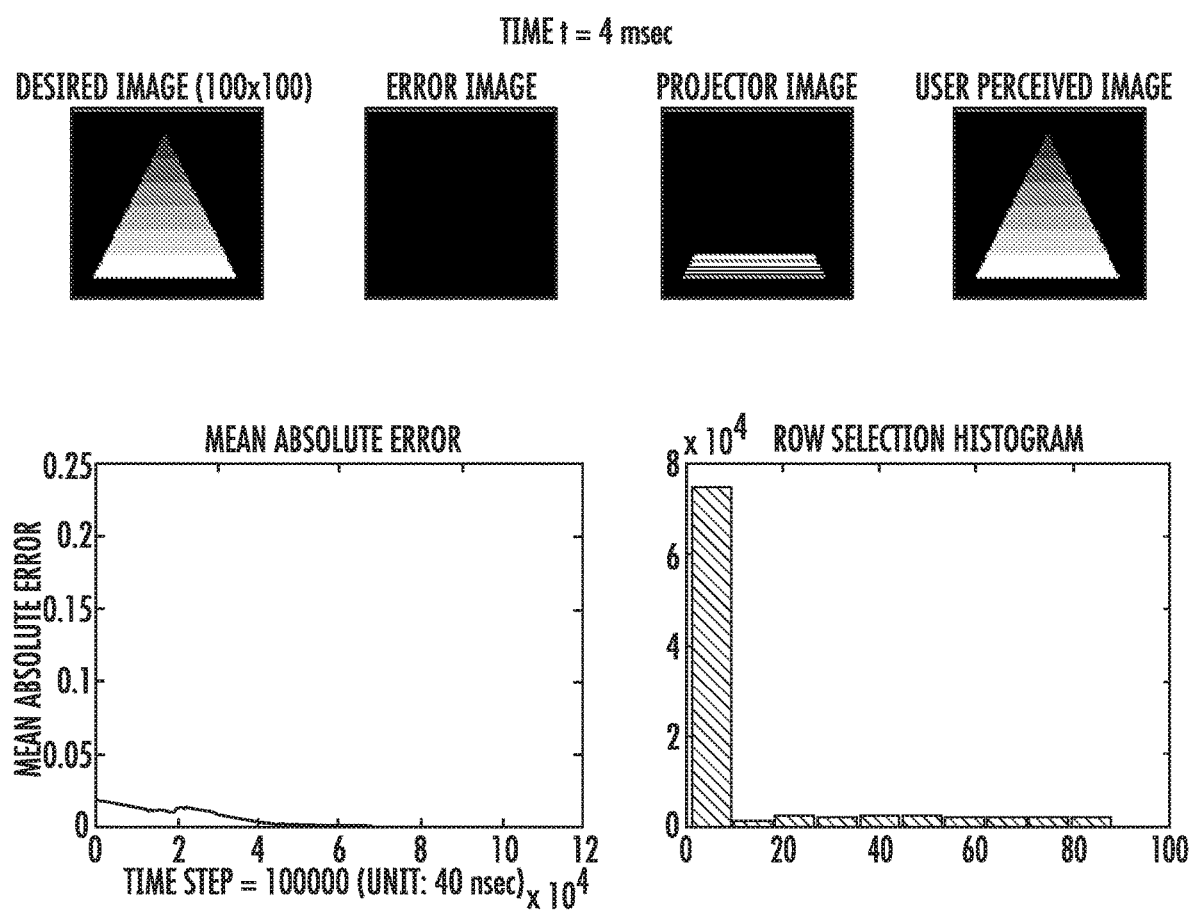

In FIG. 7E, time=4 ms, and the error image is blank, indicating no difference between the desired image and the perceived image. This is also shown by the mean absolute error graph, which shows a value of zero. In other words, the systems and methods described herein can provide a user perceived image having acceptably low error in only 1 millisecond and having essentially no error in only 4 milliseconds. In contrast, conventional systems have a latency of 50 milliseconds or more.

To show how well this method works for complex images, we now refer to another example using a complex, grayscale image, although the same principles may be applied to render color images.

FIGS. 8A through 8K illustrate the operation of systems and methods according to an embodiment of the subject matter described herein using a complex image.

Figure 8A:
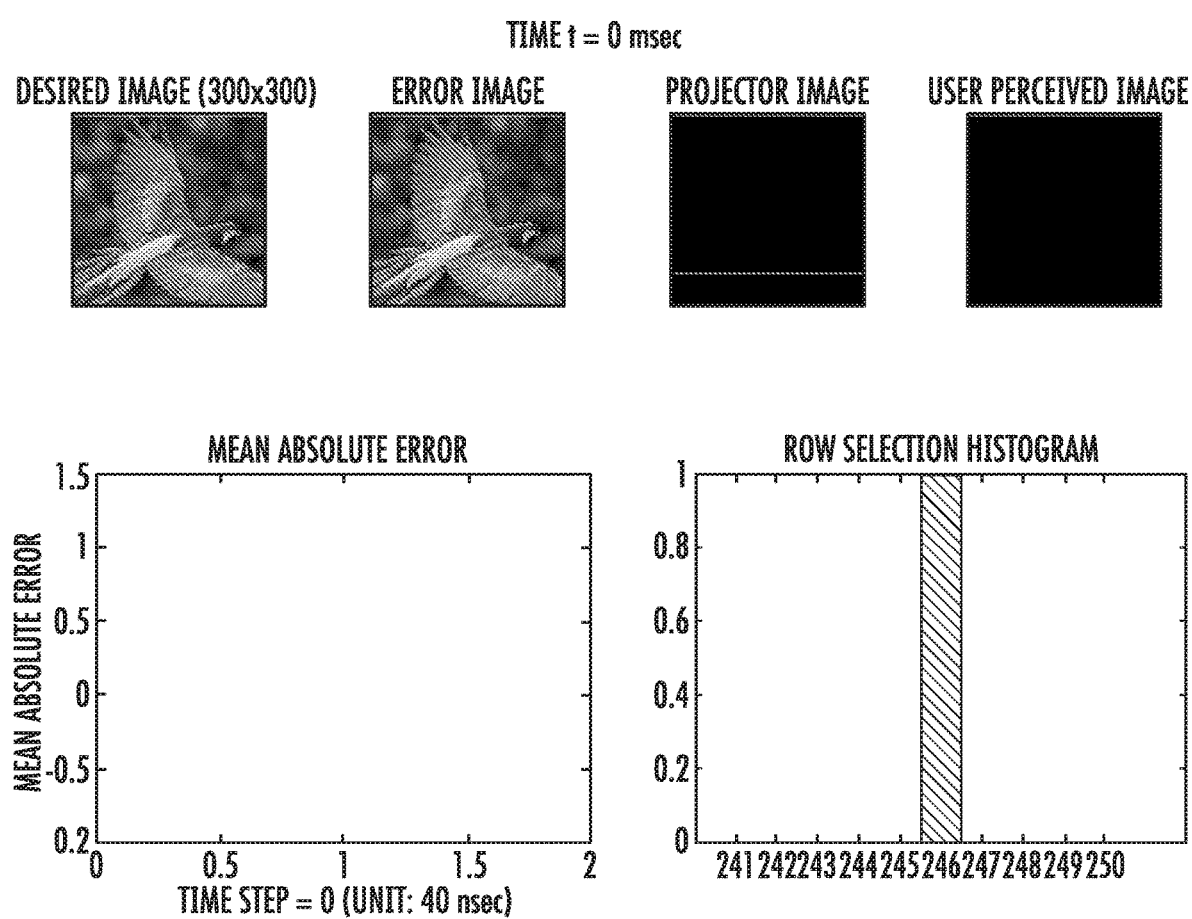
FIGS. 8A through 8K illustrate the operation of systems and methods according to an embodiment of the subject matter described herein using a complex image.

Referring now to FIG. 8A, time=0 ms, the desired image is on the left, the user perceived image is on the right, and the error image is the difference between the two and thus looks like the desired image. The row selection histogram indicates that the algorithm identified row 246 of the image as the row having the largest error, and a close look at that row in the desired image reveals a high incidence of very bright pixels. The algorithm determined that all pixels in that row should be set to ON, as can be seen by the projector image.

Figure 8B:
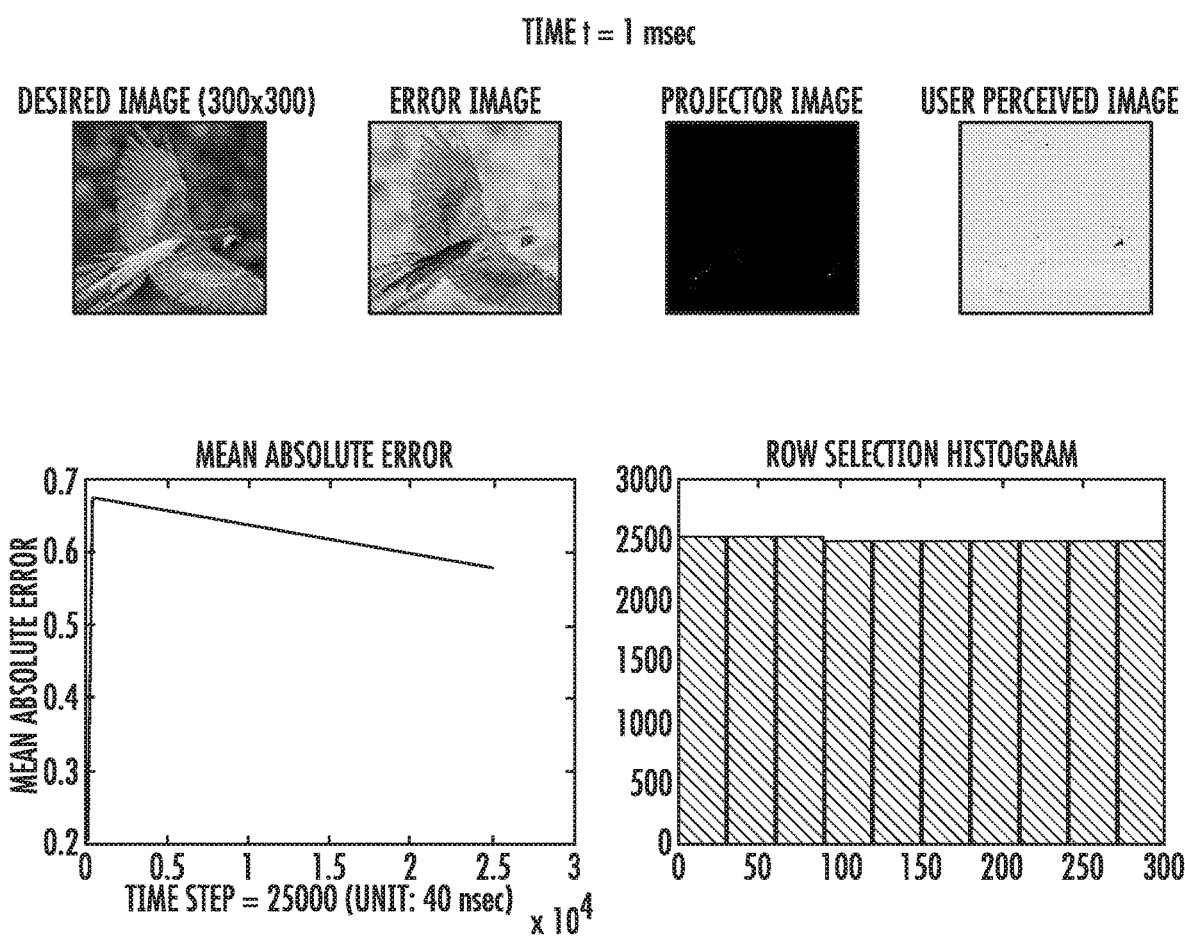
Figure 8C:
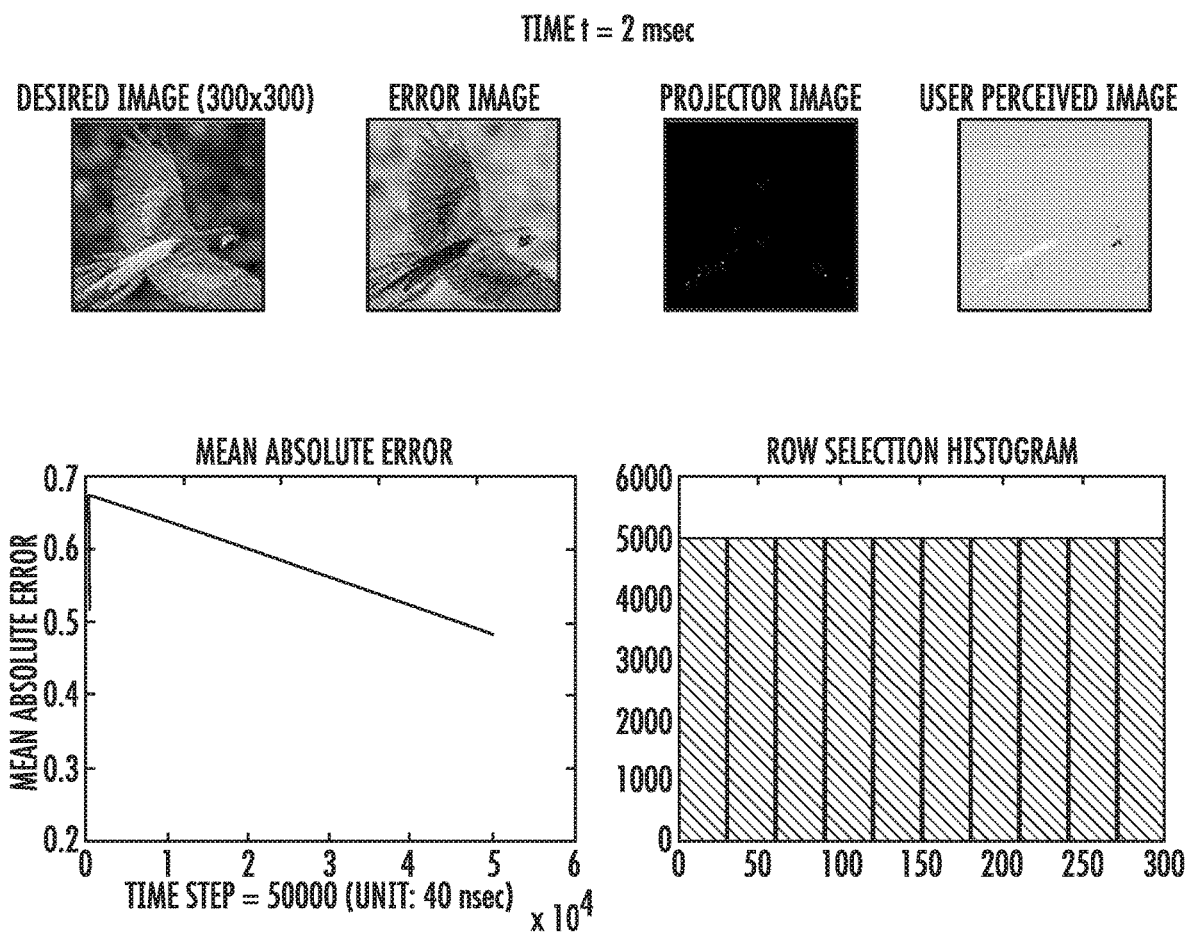
Figure 8D:
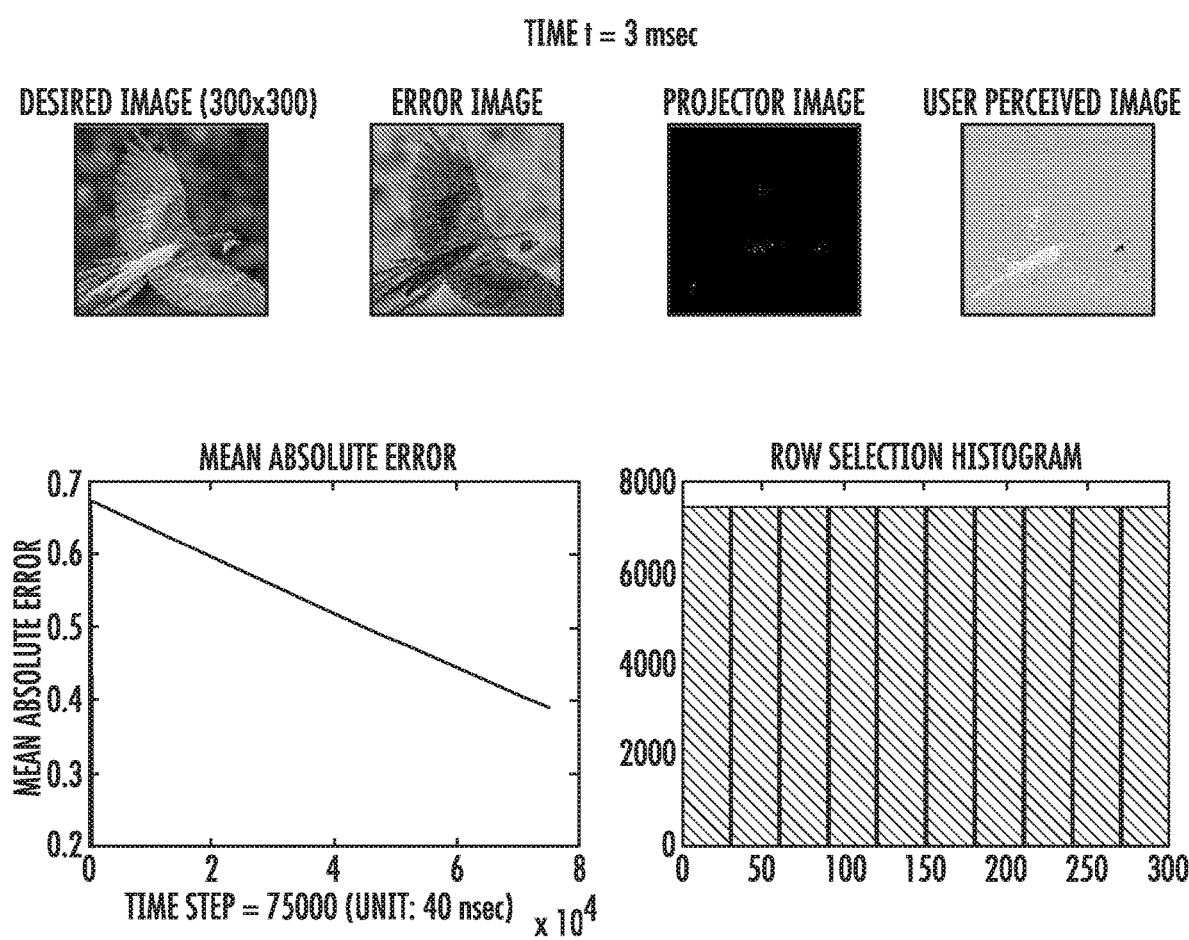
Figure 8E:
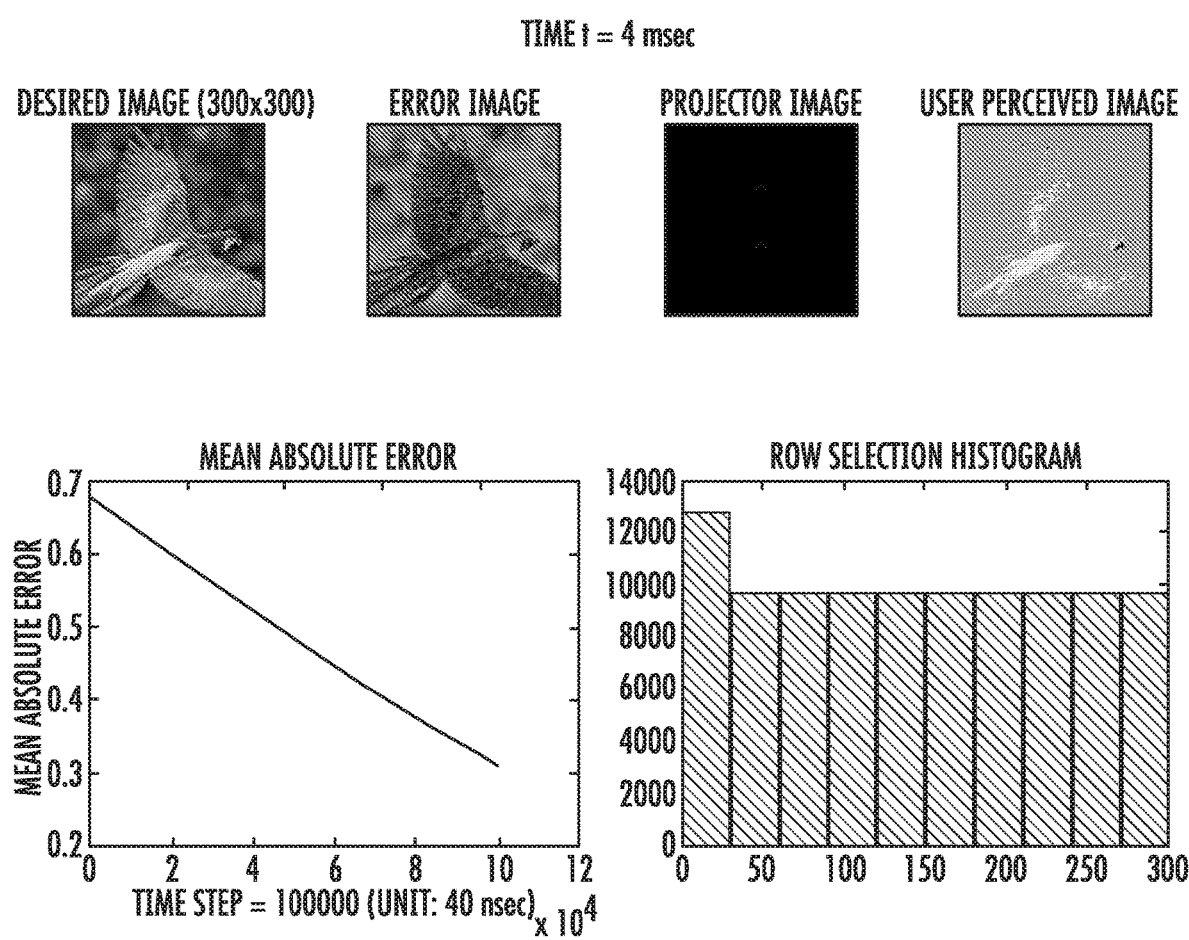
Figure 8F:
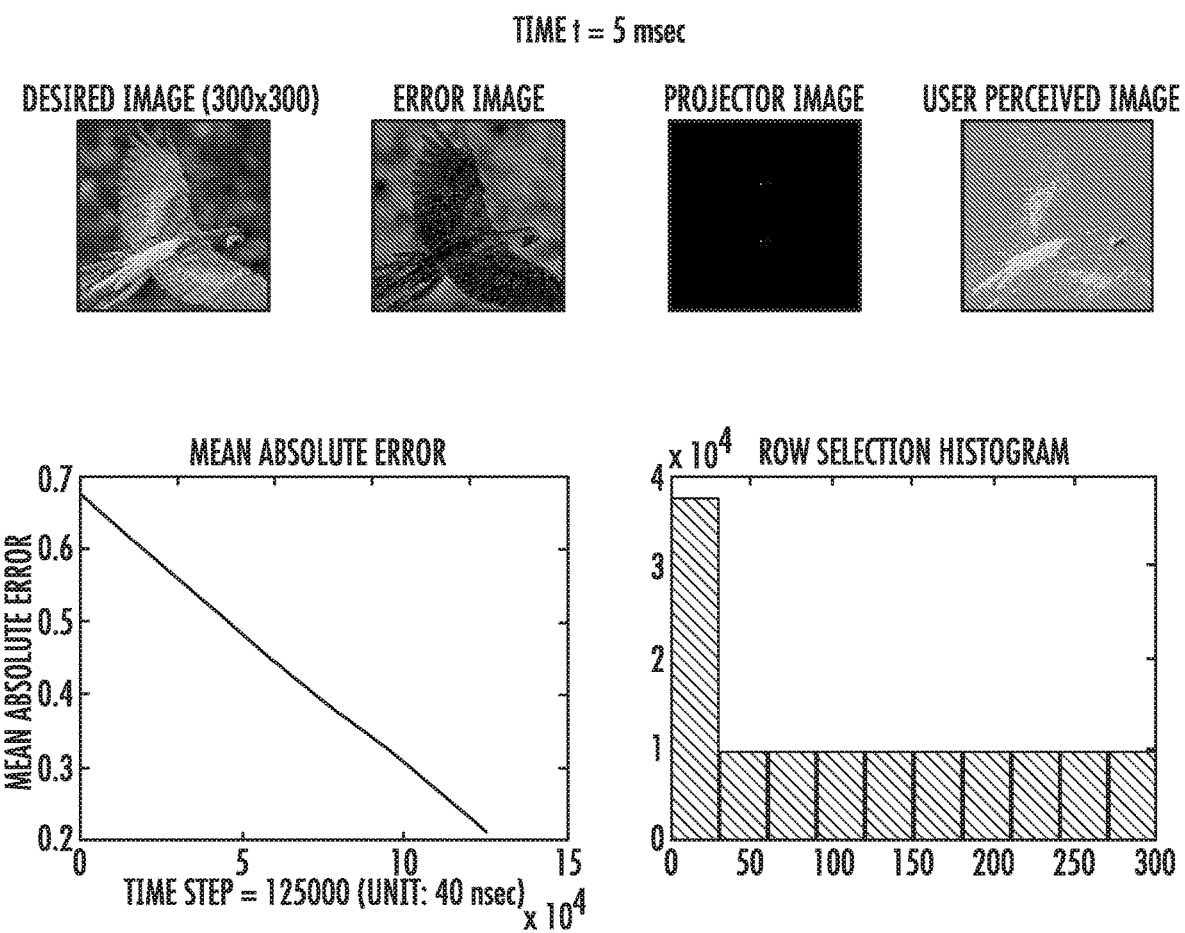
Figure 8G:
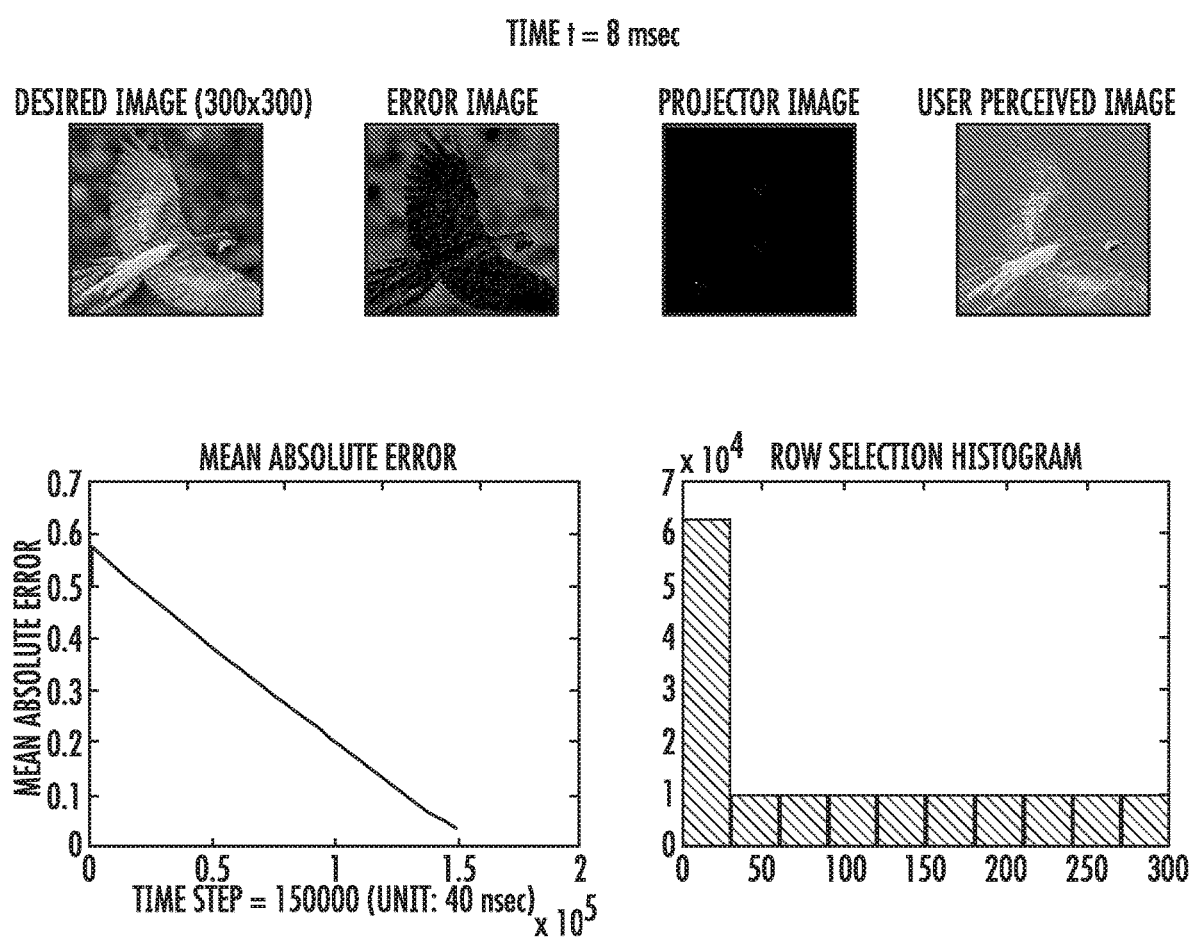
Figure 8H:
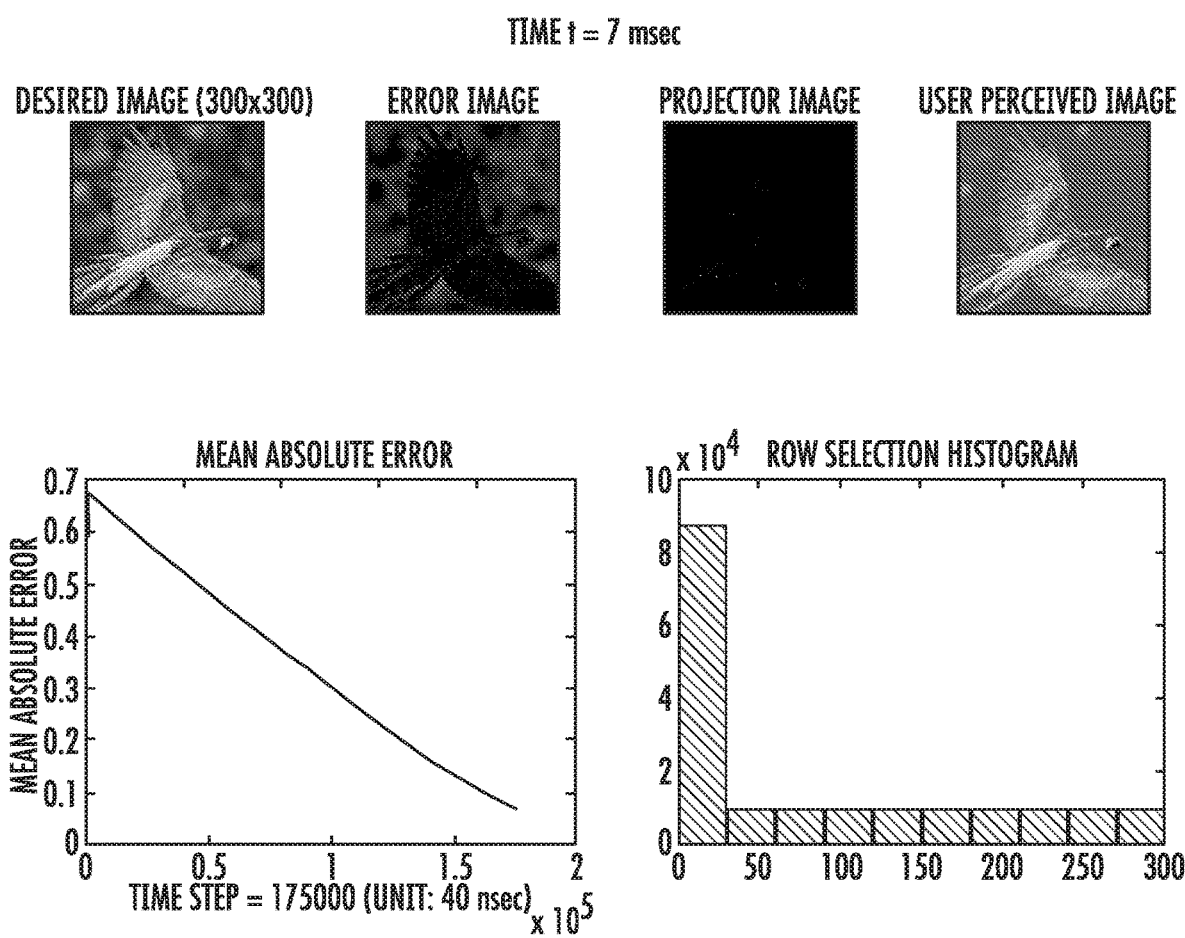

In FIG. 8B, at time 1 ms, after approximately 25,000 row updates, the algorithm has chosen to light almost all pixels, resulting in the user perceived image showing almost all white except for a few pixels scattered throughout the image that have remained unlit. The error image shows the calculated difference between the desired image and the user perceived image, and the projector image is now mostly dark to compensate for the overly bright user-perceived image.

Figure 8I:
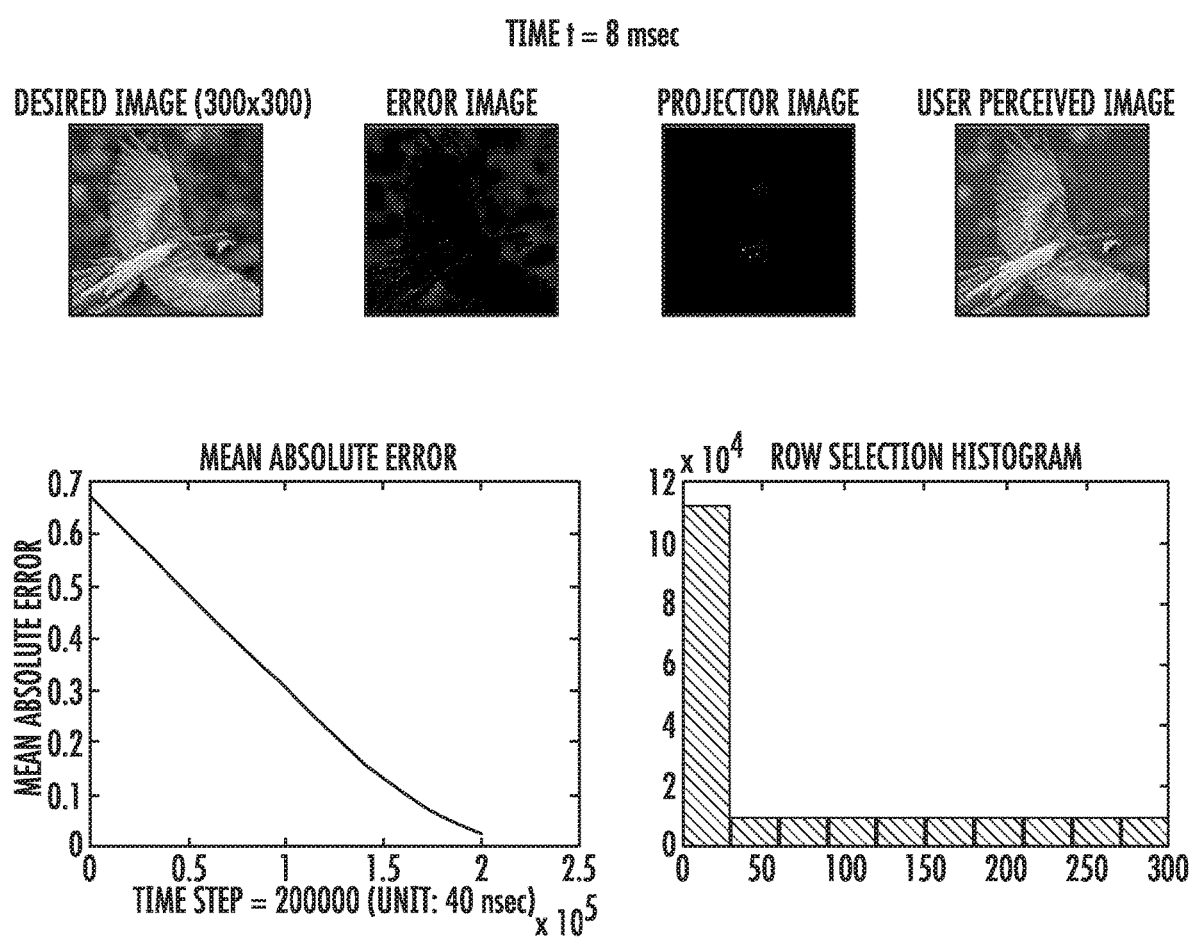
Figure 8J:
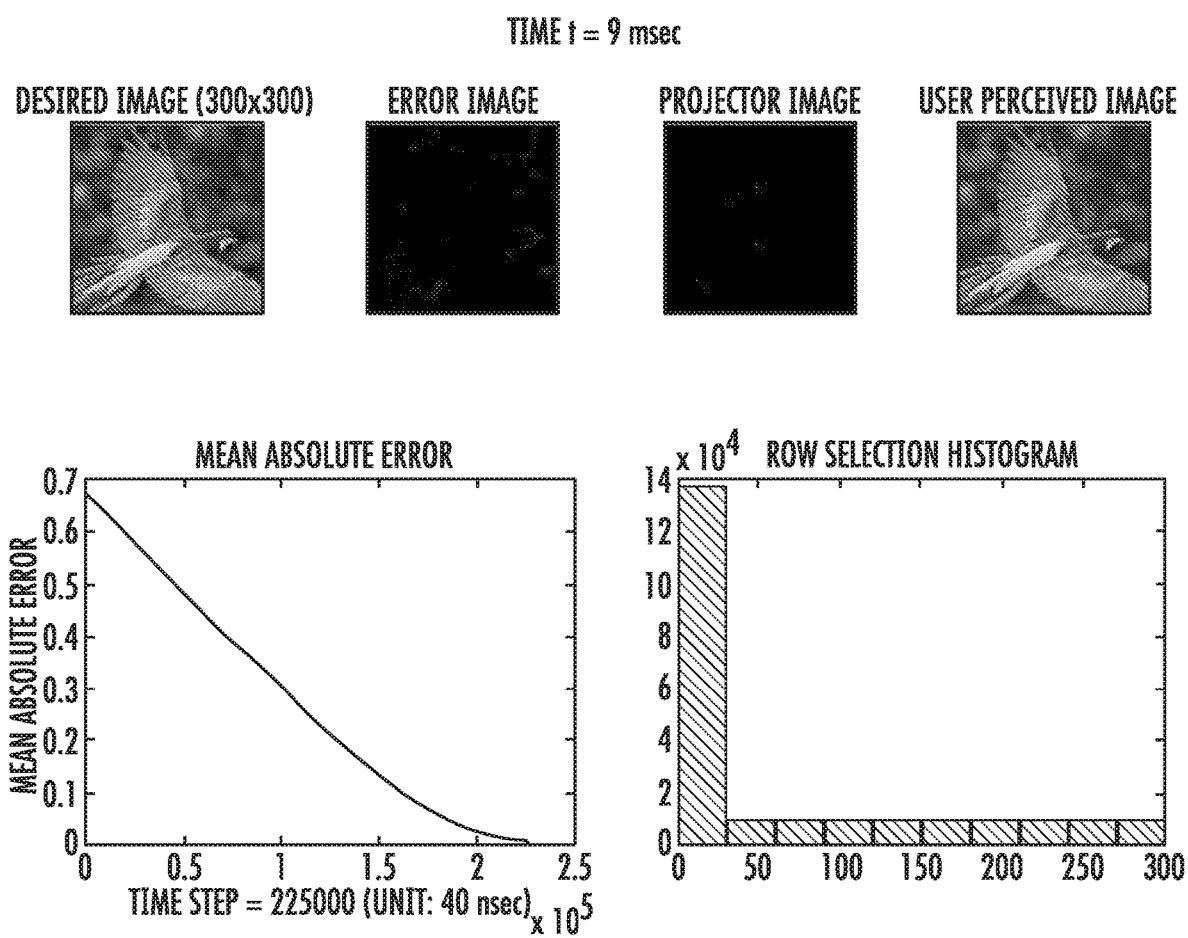
Figure 8K:
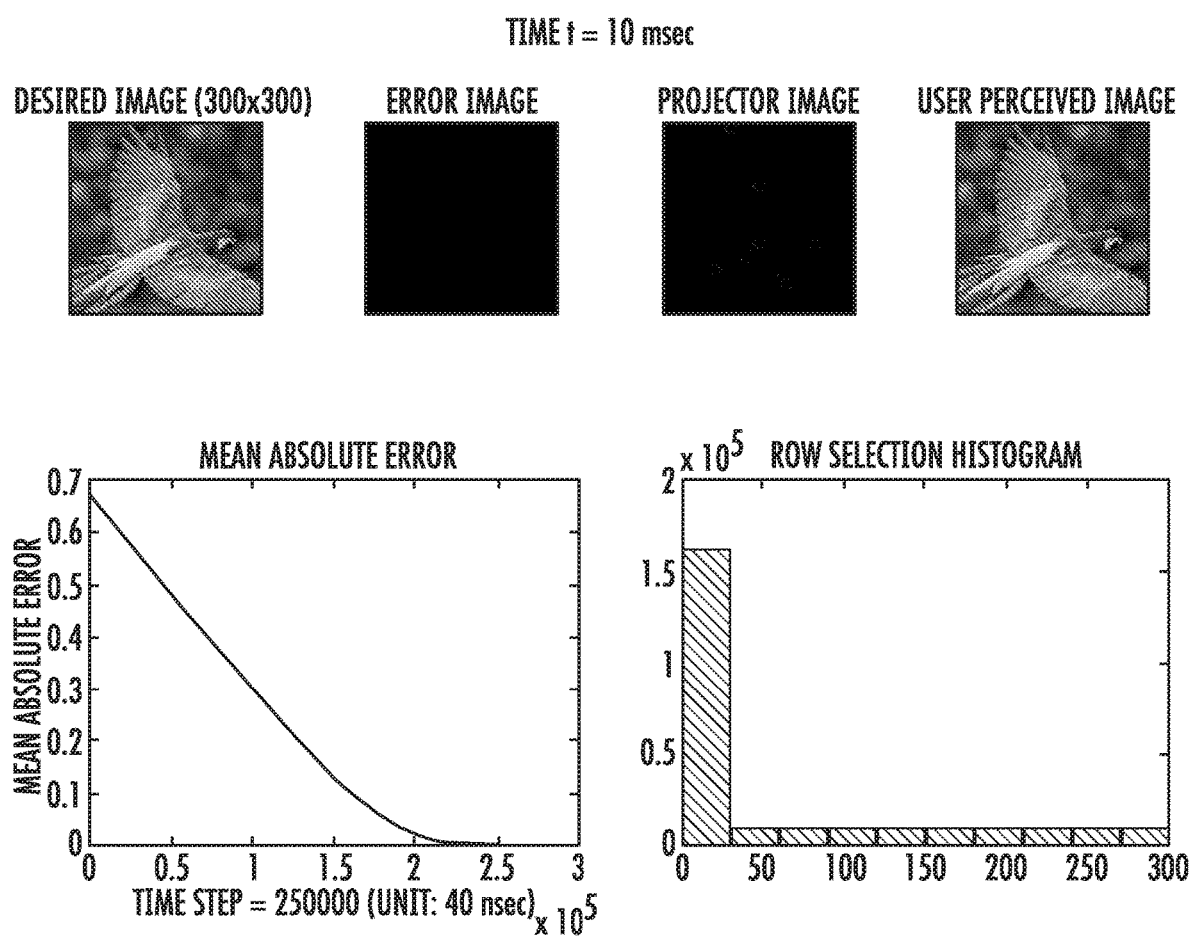

In FIGS. 8C through 8K, the projector image remains mostly dark except for a few portions of the image which should continue to be perceived as bright while the rest of the user-perceived image darkens. As can be seen in FIG. 8I, the user perceived image approaches acceptable error levels in as early as 8 millisecond and approaches zero error only 1 millisecond after that. Thus, even for complex user perceived images, the systems and methods described herein show a latency that is less than one-fifth of the time of conventional systems.

Although the examples shown in FIGS. 7A through 8K are grayscale images, the same principles of calculating an error image, identifying a row or other portion of the image as having the largest error, updating the projector image, and recalculating user perceived image may be applied to color images as well. For example, error may be calculated as a difference in perceived color or color intensity.

For display systems that use a color wheel or other time-multiplexed color system such as RGB LEDs, error may be calculated for each color independently and the projector image updated to compensate for error of a particular color during that color's time slot, e.g., when the DMD is being illuminated with that color. In this approach, when the illumination color changes, all pixels that do not include that color will have high error values and are thus likely to be identified by the algorithm as needing to be changed, e.g., to turn those pixels OFF.

Alternatively, error may be calculated for all colors at the same time and the projector image updated continually, where the user perceived image is updated while considering the color currently being used to illuminate the DMD. Here also, pixels that do not include as a color component the current color being used to illuminate the micromirror array will have a higher color error than those pixels that do include that color component.

The availability of RGB LEDs makes possible two very interesting alternative embodiments: rather than time-multiplexing illumination of the colors pure red, pure green, and pure blue, one embodiment considers the overall color error of one of the colors and adjusts the intensity of the illumination source. To use a simple example to illustrate the point, if the desired image is a solid field of dim blue, for example, by adjusting the intensity of the blue LED, it may be possible to simply leave all of the pixels in the ON position and dimly lit, rather than having to continually perform a 50% duty cycle for a blue LED at maximum brightness.

In yet another embodiment, the fact that RGB LEDs may be adjusted to illuminate the DMD with any color (e.g., by adjusting the intensity of each of the red, green, and blue LEDs individually) allows us to discard the time-multiplexed RGB mode entirely, and instead calculate a global color error and use that color error to dictate what hue and intensity should next be provided by the RGB LED illumination source. In this embodiment, by adjusting the hue and intensity of the illumination source, more subtle nuances of color may be displayed with few row updates and thus even lower latency. To again use a simple example to illustrate the point, if the desired image is a solid field that changes from bright red to dim green, for example, it is possible to achieve this change in user perceived image by simply changing the hue and intensity of the illumination source, potentially without changing the state of any of the micromirrors.

The principles described herein apply not only to temporal dithering but also to spatial dithering as well, making them suitable for displaying dynamic images. The error calculation would be the same as above. In one embodiment, the desired image is calculated not only for the current field of view of the user but also extended to accommodate the range of possible motion and/or change of pose that the user of the head mounted display may perform. By calculating a larger image field in advance, the pose tracker need only identify the portion of that larger field to be rendered as the desired image, and the methods and systems described herein apply without modification.

Although the examples described above operate on rows of a displayed image, the subject matter described herein is not so limited, but may be applied to portions of rows, areas, or other subsections of an image, as is appropriate for the display technology. Although conventional DMDs have row and column addressable pixels, current DMDs are designed such that an entire row must be updated at the same time, as befits a display that is designed to accommodate the scan-line-based approach used by conventional television and broadcast technology. However, by modification of DMD control hardware to change the minimum portion of an image that can be updated, the principles applied herein may be adapted to calculate error for some portion other than a single row, i.e., whatever the minimum portion of the image happens to be.

Although the examples described above calculate error based on the difference between the desired image and the user perceived image, these error calculations are not limited to a simple calculation of difference, but may also consider other factors. For example, error minimization may consider aspects of human physiology such as the importance of a particular object in the visual field, human ability to perform edge detection in the visual field, and the like.

4.6 HMD Integration

In order to test our low-latency tracking and rendering solution, we will integrate our modified miniature DMD projectors [1] into an optical see-through HMD with a cluster of miniature tracking cameras, as described in 3.1. In recent years, we have constructed see-through HMDs, as well as modified commercial ones in order to adapt them for use in AR systems. One of our designs introduced an "orthoscopic" video see-through unit which featured direct unobstructed peripheral imagery around the borders of the display, as seen by the wearer. Across that border, we were able to achieve registration of the direct peripheral imagery with the merged video/synthetic imagery within the display [63].

The systems and methods described herein include: a low-latency rendering method which can periodically generate high-quality color+depth maps and just-in-time image updates using most recent viewing transform from the tracker; a spatio-temporal dithering based image postprocessing approach that considers human visual perception to approximate a rendered color image with a sequence of 1-bit arbitrary color images which can be efficiently displayed. Implement a most suitable approach using an FPGA for color sequence computation and determination of scanlines which need to be updated, and also for low-level control over the micromirror-based display; and a low-latency interface to the micromirror display units with direct scan line access.

5 Benefits for Society, Education, and Research

Societal.

The presented AR solution, combined with emerging comfortable, eyeglass-style headworn displays should enable a wide range of applications to benefit from visual augmentation. Many applications that today use stationary stereo TVs for augmented visualization will now be able to use head-worn displays and reap the benefits of more natural hand-eye coordination and augmented imagery anywhere the user looks.

Educational.

The presented AR solution will be integrated into at least 3 graduate classes, classes in which students pursue individual term projects: Computer Vision (Comp 776) Exploring Virtual Worlds (Comp 872), and Telepresence (Comp 790). In each of these classes, the investigators expect the presented system to stimulate student exploration of new directions in rendering, tracking, image acquisition and reconstruction, augmented reality applications and telepresence solutions.

Research.

The investigators expect the presented latency reduction framework to be adopted by other AR researchers, allowing more effective visual interaction. Beyond head-mounted displays, the presented approach is expected to be useful for spatial augmented reality and handheld AR devices that rely on low-latency visual feedback in response to moving objects and gestures.

Motivated by the realization that decades after the introduction of Augmented Reality, its exciting promise continues to be hampered by the latency present in all of today's AR systems. The subjects and methods described herein make use of the fundamental insight that imagery from vision-based tracking cameras can be processed in scanline fragments instead of frame-by-frame, and that an AR HMD using DMD technology can update scanlines at MHz rates. This strategy enables detection of HMD motion at faster rates and with lower latency; it also enables presentation of registered imagery with analogous speedups. Thus it holds the potential to minimize lag-induced registration errors, which are the main effect of the unacceptably high latency in today's systems.

Each of the following references is incorporated herein by reference in its entirety:

[1] DLP Discovery 4100 Development Kit. http://www.ti-.com/tool/dlpd4x00kit, January 2014.

[2] B. D. Adelstein, T. G. Lee, and S. R. Ellis. Head tracking latency in virtual environments: psychophysics and a model. In Proceedings of the Human Factors and Ergonomics Society Annual Meeting, volume 47, pages 2083-2087. SAGE Publications, 2003.

[3] Stylianos Asteriadis, Kostas Karpouzis, and Stefanos Kollias. Head pose estimation with one camera, in uncalibrated environments. In Proceedings of the 2010 workshop on Eye gaze in intelligent human machine interaction, EGIHMI '10, pages 55-62, New York, N.Y., USA, 2010. ACM.

[4] Peter N. Belhumeur and David J. Kriegman. What is the set of images of an object under all possible illumination conditions? Int. J. Comput. Vision, 28(3):245-260, July 1998.

[5] T. P. Caudell and D. W. Mizell. Augmented reality: an application of heads-up display technology to manual manufacturing processes. In System Sciences, 1992. Proceedings of the Twenty-Fifth Hawaii International Conference on, volume ii, pages 659-669 vol. 2, January 1992.

[6] B. Clipp, J. Lim, J. M. Frahm, and M. Pollefeys. Parallel, real-time visual slam. In Intelligent Robots and Systems (IROS), 2010 IEEE/RSJ International Conference on, pages 3961-3968. IEEE, 2010.

[7] Greg Coombe. Practical Surface Light Fields. Phd dissertation, 2007.

[8] Greg Coombe, Chad Hantak, Radek Grzeszczuk, and Anselmo Lastra. Online construction of surface light fields. In EGSR, 2005.

[9] Greg Coombe, Mark Harris, and Anselmo Lastra. Radiosity on graphics hardware. In Proceedings of Graphics Interface 2004.

[10] Greg Coombe and Anselmo Lastra. An incremental weighted least squares approach to surface lights fields. In GRAPP 2006, International Conference on Computer Graphics Theory and Applications, pages 84-91.

[11] A. J. Davison. Real-time simultaneous localisation and mapping with a single camera. In Computer Vision, 2003. Proceedings. Ninth IEEE International Conference on, pages 1403-1410. Ieee, 2003.

[12] A. J. Davison, I. D. Reid, N. D. Molton, and O. Stasse. Monoslam: Real-time single camera slam. Pattern Analysis and Machine Intelligence, IEEE Transactions on, 29(6):1052-1067, 2007.

[13] Mingsong Dou, Henry Fuchs, and Jan-Michael Frahm. Scanning and tracking dynamic objects with commodity depth cameras. In Mixed and Augmented Reality (ISMAR), 2013 IEEE International Symposium on, pages 99-106, 2013.

[14] Ahmed Elgammal. Learning to track: Conceptual manifold map for closed-form tracking. In Proceedings of the 2005 IEEE Computer Society Conference on Computer Vision and Pattern Recognition (CVPR'05)—Volume 1-Volume 01, CVPR '05, pages 724-730, Washington, D.C., USA, 2005. IEEE Computer Society. 1

[15] S. R. Ellis, A. Wolfram, and B. D. Adelstein. Three dimensional tracking in augmented environments: user performance trade-offs between system latency and update rate. In Proceedings of the Human Factors and Ergonomics Society annual meeting, volume 46, pages 2149-2153. SAGE Publications, 2002.

[16] Steven Feiner, Blair MacIntyre, Tobias Hollerer, and Anthony Webster. A touring machine: Prototyping 3d mobile augmented reality systems for exploring the urban environment. In Proceedings of the 1st IEEE International Symposium on Wearable Computers, ISWC '97, pages 74-, Washington, D.C., USA, 1997. IEEE Computer Society.

[17] Steven Feiner, Blair Macintyre, and Dor'ee Seligmann. Knowledge-based augmented reality. Commun. ACM, 36(7):53-62, July 1993.

[18] Martin A. Fischler and Robert C. Bolles, Random sample consensus: a paradigm for model fitting with applications to image analysis and automated cartography. Commun. ACM, 24(6):381-395, June 1981.

[19] P. Forsse and E. Ringaby. Rectifying rolling shutter video from hand-held devices. In Computer Vision and Pattern Recognition (CVPR), 2010 IEEE Conference on, pages 507-514, June 2010.

[20] E. R. Fossum. Cmos image sensors: electronic camera on a chip. In Electron Devices Meeting, 1995. IEDM '95, International, pages 17-25, December 1995.

[21] Henry Fuchs. Augmenting reality for medicine, training, presence and telepresence. In Proceedings IEEE International Symposium on Mixed and Augmented Reality (ISMAR 2010), 2010.

[22] Henry Fuchs, Mark A. Livingston, Ramesh Raskar, Andrei State, Jessica R. Crawford, Paul Rademacher, Samuel H. Drake, and Anthony A. Meyer. Augmented reality visualization for laparoscopic surgery. In Proceedings of the First International Conference on Medical Image Computing and Computer-Assisted Intervention, pages 934-943. Springer-Verlag, 1998.

[23] J. L. Gabbard, D. Hix, and J. E. Swan. User-centered design and evaluation of virtual environments. Computer Graphics and Applications, IEEE, 19(6):51-59, 1999.

[24] Jinwei Gu, Y. Hitomi, T. Mitsunaga, and S. Nayar. Coded rolling shutter photography: Flexible space-time sampling. In Computational Photography (ICCP), 2010 IEEE International Conference on, pages 1-8, March 2010.

[25] G. D. Hager and P. N. Belhumeur. Efficient region tracking with parametric models of geometry and illumination. Pattern Analysis and Machine Intelligence, IEEE Transactions on, 20(10):1025-1039, October 1998.

[26] K. J. Hanna. Direct multi-resolution estimation of ego-motion and structure from motion. In Visual Motion, 1991, Proceedings of the IEEE Workshop on, pages 156-162, October 1991.

[27] Mark Harris. Real-Time Cloud Simulation and Rendering. Phd dissertation (available as technical report #tr03-040), 2003.

[28] Mark J. Harris, William V. Baxter, Thorsten Scheuermann, and Anselmo Lastra. Simulation of cloud dynamics on graphics hardware. In Proceedings of Graphics Hardware 2003.2

[29] Mark J. Harris, Greg Coombe, Thorsten Scheuermann, and Anselmo Lastra. Physically-based visual simulation on graphics hardware. In SIGGRAPH/Eurographics Workshop on Graphics Hardware, 2002.

[30] David J. Heeger and Allan D. Jepson. Subspace methods for recovering rigid motion i: Algorithm and implementation. International Journal of Computer Vision, 7:95-117, 1992.

[31] Justin Hensley. Increasing Rendering Performance of Graphics Hardware. Phd dissertation, 2007.

[32] Justin Hensley, Anselmo Lastra, and Montek Singh. An area- and energy-efficient asynchronous booth multiplier for mobile devices. In Proc. Int. Conf. Computer Design (ICCD), pages 18-25, 2004.

[33] Justin Hensley, Anselmo Lastra, and Montek Singh. A scalable counterflow-pipelined asynchronous radix-4 booth multiplier. In Proceedings of the 11th IEEE International Symposium on Computer Design. IEEE Computer Society, 2005.

[34] Justin Hensley, Thorsten Scheuermann, Montek Singh, and Anselmo Lastra. Fast summedarea table generation and its applications. Proceedings of Eurographics 2005 and Computer Graphics Forum, 2005.

[35] Justin Hensley, Montek Singh, and Anselmo Lastra. A fast, energy-efficient z-comparator. In Proceedings of Graphics Hardware 2005, pages 41-44.

[36] Marco C. Jacobs, Mark A. Livingston, and Andrei State. Managing latency in complex augmented reality systems. In Proceedings of the 1997 symposium on Interactive 3D graphics, I3D '97, pages 49-ff, New York, N.Y., USA, 1997. ACM.

[37] J. Jerald, T. Peck, F. Steinicke, and M. Whitton. Sensitivity to scene motion for phases of head yaws. In Proceedings of the 5th symposium on Applied perception in graphics and visualization, pages 155-162. ACM, 2008.

[38] J. Jerald, M. Whitton, and F. P. Brooks Jr. Scene-motion thresholds during head yaw for immersive virtual environments. ACM Transactions on Applied Perception (TAP), 9(1):4, 2012.

[39] Andrew Jones, Magnus Lang, Graham Fyffe, Xueming Yu, Jay Busch, Ian McDowall, Mark Bolas, and Paul Debevec. Achieving eye contact in a one-to-many 3d video teleconferencing system. ACM Transactions on Graphics, 28(3):64:1-64:8, July 2009.

[40] Peter Lincoln, Andrew Nashel, Adrian Ilie, Herman Towles, Gregory Welch, and Henry Fuchs. Multi-view lenticular display for group teleconferencing. In Proceedings of the 2nd International Conference on Immersive Telecommunications, IMMERSCOM '09, pages 22:1-22:8, ICST, Brussels, Belgium, Belgium, 2009. ICST (Institute for Computer Sciences, Social-Informatics and Telecommunications Engineering).

[41] Peter Lincoln, Greg Welch, Andrew Nashel, Adrian Ilie, Andrei State, and Henry Fuchs. Animatronic shader lamps avatars. In Proceedings of the 2009 8th IEEE International Symposium on Mixed and Augmented Reality, ISMAR '09, pages 27-33, Washington, D.C., USA, 2009. IEEE Computer Society. 3

[42] Andrew Maimone and Henry Fuchs. Encumbrance-free telepresence system with real-time 3d capture and display using commodity depth cameras. In Mixed and Augmented Reality (ISMAR), 2011 10th IEEE International Symposium on, October 2011.

[43] Andrew Maimone and Henry Fuchs. A first look at a telepresence system with room-sized real-time 3d capture and life-sized tracked display wall. In Artificial Reality and Telexistence (ICAT), 2011 21st International Conference on, November 2011.

[44] Andrew Maimone and Henry Fuchs. Computational augmented reality eyeglasses. In Mixed and Augmented Reality (ISMAR), 2013 IEEE International Symposium on, pages 29-38, 2013,

[45] Andrew Maimone, Xubo Yang, Nate Dierk, Andrei State, Mingsong Dou, and Henry Fuchs. General-purpose telepresence with head-worn optical see-through displays and projector-based lighting. To appear in: IEEE Virtual Reality 2013, March 2013.

[46] William R. Mark, Leonard McMillan, and Gary Bishop. Post-rendering 3d warping. In Proceedings of the 1997 symposium on Interactive 3D graphics, I3D '97, pages 7-16, New York, N.Y., USA, 1997. ACM.

[47] U. Muehlmann, M. Ribo, P. Lang, and A. Pinz. A new high speed CMOS camera for real-time tracking applications. In Robotics and Automation, 2004. Proceedings. ICRA '04. 2004 IEEE International Conference on, volume 5, pages 5195-5200 Vol. 5, April-1 May 2004.

[48] Hiroshi Murase and Shree K. Nayar. Visual learning and recognition of 3-d objects from appearance. Int. J. Comput. Vision, 14(1):5-24, January 1995.

[49] Junichi Nakamura. Image Sensors and Signal Processing for Digital Still Cameras. CRC Press, Inc., Boca Raton, Fla., USA, 2005.

[50] A. Nashel and H. Fuchs. Random hole display: A non-uniform barrier autostereoscopic display. In 3DTV Conference: The True Vision—Capture, Transmission and Display of 3D Video, 2009, pages 1-4, May 2009.

[51] U. Neumann and H. Fuchs. A vision of telepresence for medical consultations and other applications. In Proceedings of the Sixth International Symposium on Robotics Research, pages 565-571, October 1993.

[52] R. A. Newcombe and A. J. Davison. Live dense reconstruction with a single moving camera. In Computer Vision and Pattern Recognition (CVPR), 2010 IEEE Conference on, pages 1498-1505. IEEE, 2010.

[53] M. Pollefeys, R. Koch, and L. V. Gool. Self-calibration and metric reconstruction inspite of varying and unknown intrinsic camera parameters. International Journal of Computer Vision, 32(1):7-25, 1999.

[54] M. Pollefeys, D. Nist'er, J. M. Frahm, A. Akbarzadeh, P. Mordohai, B. Clipp, C. Engels, D. Gallup, S.-J. Kim, P. Merrell, C. Salmi, S. Sinha, B. Talton, L. Wang, Q. Yang, H. Stew'enius, R. Yang, G. Welch, and H. Towles. Detailed real-time urban 3d reconstruction from video. International Journal of Computer Vision, 78(2):143-167, 2008.

[55] M. Pollefeys, L. Van Gool, M. Vergauwen, F. Verbiest, K. Cornelis, J. Tops, and R. Koch. Visual modeling with a hand-held camera. International Journal of Computer Vision, 59(3):207-232, 2004.

[56] J. Pool, A. Lastra, and M. Singh. An energy model for graphics processing units. In Computer Design (ICCD), 2010 IEEE International Conference on, pages 409-416, October 2010.

[57] Jeff Pool, A. Lastra, and Montek Singh. Power-gated arithmetic circuits for energy-precision tradeoffs in mobile graphics processing units. Journal of Low-Power Electronics (JOLPE), 7(2):148-162, 2011.

[58] Jeff Pool, Anselmo Lastra, and Montek Singh. Energy-precision tradeoffs in mobile graphics processing units. In Proc. Int. Conf. Computer Design (ICCD), page 6067.

[59] Jeff Pool, Anselmo Lastra, and Montek Singh. Precision selection for energy-efficient pixel shaders. In Proc. High Performance Graphics. ACM, Aug. 5-7, 2011.

[60] Jeff Pool, Anselmo Lastra, and Montek Singh. Lossless compression of variable-precision floating-point buffers on gpus. In Proc. Symposium on Interactive 3D Graphics (I3D), Mar. 9-11, 2012.

[61] R. Raguram, J. M. Frahm, and M. Pollefeys. A comparative analysis of ransac techniques leading to adaptive real-time random sample consensus. Computer Vision—ECCV 2008, pages 500-513, 2008.

[62] Jannick P. Rolland and Henry Fuchs. Optical versus video see-through head-mounted displays. In in Medical Visualization. Presence: Teleoperators and Virtual Environments, pages 287-309, 2000.

[63] Andrei State, Kurtis P. Keller, and Henry Fuchs. Simulation-based design and rapid prototyping of a parallax-free, orthoscopic video see-through head-mounted display. In Mixed and Augmented Reality, 2005. Proceedings. Fourth IEEE and ACM International Symposium on, pages 28 31, October 2005.

[64] Josh Steinhurst, Greg Coombe, and Anselmo Lastra. Reordering for cache conscious photon mapping. In Proceedings of Graphics Interface 2005.

[65] Joshua Steinhurst. Practical Photon Mapping in Hardware. Phd dissertation, 2007.

[66] Joshua Steinhurst, Greg Coombe, and Anselmo Lastra. Reducing photon mapping bandwidth by query reordering. IEEE Transactions on Visualization and Computer Graphics, 14(1):13-24, 2008.

[67] Joshua Steinhurst and Anselmo Lastra. Global importance sampling of glossy surfaces using the photon map. In IEEE Symposium on Interactive Ray Tracing, 2006.

[68] M. C. Whitton and F. P. Brooks. Praeger Security International, 2008.

[69] H. Yang, M. Pollefeys, G. Welch, J. M. Frahm, and A. Ilie. Differential camera tracking through linearizing the local appearance manifold. In Computer Vision and Pattern Recognition, 2007. CVPR'07. IEEE Conference on, pages 1-8. IEEE, 2007.

[70] Gu Ye, Andrei State, and Henry Fuchs. A practical multi-viewer tabletop autostereoscopic display. In Mixed and Augmented Reality (ISMAR), 2010 9th IEEE International Sympsiumon, pages 147-156, October 2010.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for minimal-latency tracking and display for matching real and virtual worlds in head-worn displays, the system comprising:

a display;
at least one processor;
a display control module for controlling projection of an image by the display to a user;
a tracking module for obtaining pose information regarding the user; and
a rendering and processing module for calculating a desired image based on the pose information determined by the tracking module and storing image data regarding the desired image, calculating an estimated user-perceived image, wherein calculating the estimated user-perceived image includes:
storing image data regarding scanline updates previously displayed by the display to the user;
storing image data regarding the current image projected to the user by the display; and
calculating, using the image data regarding scanline updates previously projected to the user and the image data regarding the current image projected by the display to the user, image data estimating an image that the user is currently perceiving,
wherein the rendering and processing module identifies, by calculating an error comprising a difference in at least one of perceived color and intensity between data corresponding to rows or other portions of the estimated user-perceived image in the image data estimating the image that the user is currently perceiving and data corresponding to rows or other portions of the desired image in the image data regarding the desired image, a row or other portion of the image currently being projected by the display having a largest error; and
wherein the display control module updates the row or other portion of the image currently being projected by the display identified as having the largest error.

2. The system of claim 1 wherein the rendering and processing module recalculates the estimated user-perceived image based on an updated projection image projected by the display and a model of human perception.

3. The system of claim 1 wherein the display comprises a head-wearable display, wherein the display control module is a component of the head-wearable display.

4. The system of claim 3 wherein the head-wearable display comprises an optical see-through display.

5. The system of claim 3 wherein the head-wearable display comprises a digital micromirror device (DMD).

6. The system of claim 5 wherein the head-wearable display module includes an illumination source for illuminating the DMD.

7. The system of claim 6 wherein the illumination source includes multiple color filters for modifying a hue of illumination of pixels that form the scanlines.

8. The system of claim 7 wherein updating the scanlines includes changing the hue and/or intensity of the illumination of the pixels that form the scan lines.

9. The system of claim 6 wherein the illumination source includes a multicolor illumination source.

10. The system of claim 9 wherein the multicolor illumination source comprises a light emitting diode (LED).

11. The system of claim 1 wherein the tracking module calculates pose based on row data received from a rolling shutter camera.

12. A method for minimal-latency tracking and display for matching real and virtual worlds in head-worn displays, the method comprising:

projecting, by a display, an image to a user;
calculating an estimated user-perceived image, wherein calculating the estimated user-perceived image includes:

storing image data regarding scanline updates previously projected by the display to the user;

storing image data regarding the image currently being projected by the display to the user; and calculating, using the image data regarding scanline updates previously projected by the display to the user and the image data regarding the image currently being projected by the display to the user, image data estimating an image that the user is currently perceiving;

calculating a desired image based on pose information regarding the user and storing image data regarding the desired image;

identifying, by calculating an error comprising a difference in at least one of perceived color and intensity between data corresponding to rows or other portions of the estimated user-perceived image in the image data estimating the image that the user is currently perceiving and data corresponding to rows or other portions of the desired image in the image data regarding the desired image, a row or other portion of the image currently being projected by the display having a largest error; and updating the row or other portion of the image currently being projected by the display identified as having the largest error.

13. The method of claim 12 comprising recalculating the estimated user-perceived image based on an updated image projected by the display and a model of human perception.

14. The method of claim 12 wherein the display comprises a head-mounted display.

15. The method of claim 12 wherein the display comprises an optical see-through display.

16. The method of claim 12 wherein calculating a desired image comprises receiving the image data regarding the desired image from a rendering module.

17. The method of claim 12 comprising determining importance values for features of the desired image and using the importance values to prioritize updating of the scanlines corresponding to the features.

18. The method of claim 12 comprising calculating the error image by calculating differences in hue and/or intensity between the image data regarding the desired image and the image data estimating the image that the user is currently perceiving.

19. The method of claim 12 wherein the pose information comprises row data received from a rolling shutter camera.

20. A non-transitory computer readable medium having stored thereon executable instructions that when executed by the processor of a computer control the computer to perform steps comprising:

projecting, by display, an image to a user;

calculating an estimated user-perceived image, wherein calculating the estimated user-perceived image includes:

storing image data regarding scanline updates previously displayed by a display to the user;

storing image data regarding the image currently being projected to the user by the display; and calculating, using the image data regarding scanline updates previously projected by the display to the user and the image data regarding the image currently being projected by the display to the user, image data estimating an image that the user is currently perceiving;

calculating a desired image based on pose information regarding the user and storing image data regarding the desired image;

identifying, by calculating an error comprising a difference in at least one of perceived color and intensity between data corresponding to rows or other portions in the image data estimating the image that the user is currently perceiving and data corresponding to rows or other portions of the desired image in the image data regarding the desired image, a row or other portion of the image currently being projected by the display having a largest error; and updating the row or other portion of the image currently being projected by the display identified as having the largest error.

* * * * *